(12) United States Patent
Chuang et al.

(10) Patent No.: US 10,875,652 B2
(45) Date of Patent: Dec. 29, 2020

(54) PASSENGER TRAY TABLE

(71) Applicant: Rockwell Collins, Inc., Cedar Rapids, IA (US)

(72) Inventors: Tim Dze-How Chuang, Encino, CA (US); Ross Leslie Carmichael, Everett, WA (US); Martti Johannes Lampela, Woodland Hills, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 748 days.

(21) Appl. No.: 15/705,858

(22) Filed: Sep. 15, 2017

(65) Prior Publication Data
US 2018/0281966 A1 Oct. 4, 2018

Related U.S. Application Data

(60) Provisional application No. 62/480,818, filed on Apr. 3, 2017.

(51) Int. Cl.
| | |
|---|---|
| *B64D 11/06* | (2006.01) |
| *A47B 46/00* | (2006.01) |
| *A47B 21/03* | (2006.01) |
| *A47B 88/407* | (2017.01) |
| *A47B 5/04* | (2006.01) |

(Continued)

(52) U.S. Cl.
CPC .......... *B64D 11/0638* (2014.12); *A47B 5/006* (2013.01); *A47B 5/04* (2013.01); *A47B 21/03* (2013.01); *A47B 21/0314* (2013.01); *A47B 46/00* (2013.01); *A47B 46/005* (2013.01); *A47B 88/407* (2017.01); *A47B 1/05* (2013.01); *A47B 88/40* (2017.01); *A47B 2021/0321* (2013.01);

(Continued)

(58) Field of Classification Search
CPC ... B64D 11/0638; A47B 46/005; A47B 5/006; A47B 21/0314; A47B 46/00; A47B 21/03; A47B 88/407; A47B 5/04; A47B 88/40; A47B 2021/0321; A47B 2021/0335; A47B 1/05; A47B 3/00; A47B 5/00; A47B 31/06; B60N 3/004; A47C 7/70

See application file for complete search history.

(56) References Cited

U.S. PATENT DOCUMENTS

| | | | | |
|---|---|---|---|---|
| 4,159,071 A | * | 6/1979 | Roca | A47C 7/70 108/42 |
| 4,726,621 A | * | 2/1988 | Muller | B60N 3/004 297/146 |

(Continued)

*Primary Examiner* — Assres H Woldemaryam
(74) *Attorney, Agent, or Firm* — Suiter Swantz pc llo

(57) ABSTRACT

A passenger tray table includes at least two hingedly connected table sections, and is operable to move between at least three positions: 1) a stowed mounting position against a fore positioned monument, where the tray table stows at an angle relative to vertical, and a top portion of the tray table is closer to the passenger than a lower portion of the passenger tray table in the stowed position, 2) a first operative position, where a front table section of the tray table lowers into a horizontal position, while the rear table section remains in the angled stowed position, and 3) a second operative position, where the front table section is disposed closer to the passenger while the rear table section of the passenger tray table is lowered to a horizontal position, in line with the front table section to provide a contiguous table surface.

20 Claims, 20 Drawing Sheets

(51) Int. Cl.
  *A47B 5/00* (2006.01)
  *B60N 3/00* (2006.01)
  *A47B 1/05* (2006.01)
  *A47B 88/40* (2017.01)

(52) U.S. Cl.
  CPC ....... *A47B 2021/0335* (2013.01); *B60N 3/004* (2013.01)

(56) References Cited

U.S. PATENT DOCUMENTS

| | | | | |
|---|---|---|---|---|
| 5,443,018 A | * | 8/1995 | Cromwell | B60N 3/004 |
| | | | | 108/44 |
| 5,876,092 A | * | 3/1999 | An | B60N 3/004 |
| | | | | 297/146 |
| 9,138,055 B2 | * | 9/2015 | Curtis | B64D 11/0638 |
| 10,494,100 B2 | * | 12/2019 | Jussli | B64D 11/00152 |
| 2009/0078169 A1 | * | 3/2009 | Osborne | B64D 11/0638 |
| | | | | 108/40 |
| 2010/0224102 A1 | * | 9/2010 | Allgood | A47B 31/06 |
| | | | | 108/44 |
| 2011/0155024 A1 | * | 6/2011 | McCaffrey | B60N 3/004 |
| | | | | 108/26 |
| 2011/0204683 A1 | * | 8/2011 | Roy | B60N 2/24 |
| | | | | 297/163 |
| 2013/0098276 A1 | * | 4/2013 | Trinko | A47C 17/46 |
| | | | | 108/33 |
| 2014/0183910 A1 | * | 7/2014 | Ulbrich-Gasparevic | B64D 11/0638 |
| | | | | 297/135 |
| 2016/0221677 A1 | * | 8/2016 | Hance | B64D 11/0638 |
| 2017/0071375 A1 | * | 3/2017 | Smith | A47G 11/004 |
| 2017/0127821 A1 | * | 5/2017 | Carter | A47B 21/02 |
| 2017/0143118 A1 | * | 5/2017 | Azkue | A47B 88/463 |
| 2017/0238696 A1 | * | 8/2017 | Ehrreich | A47B 3/0912 |
| 2017/0283067 A1 | * | 10/2017 | Darbyshire | B64D 11/0638 |
| 2017/0355465 A1 | * | 12/2017 | Trimble | B60N 3/004 |

* cited by examiner

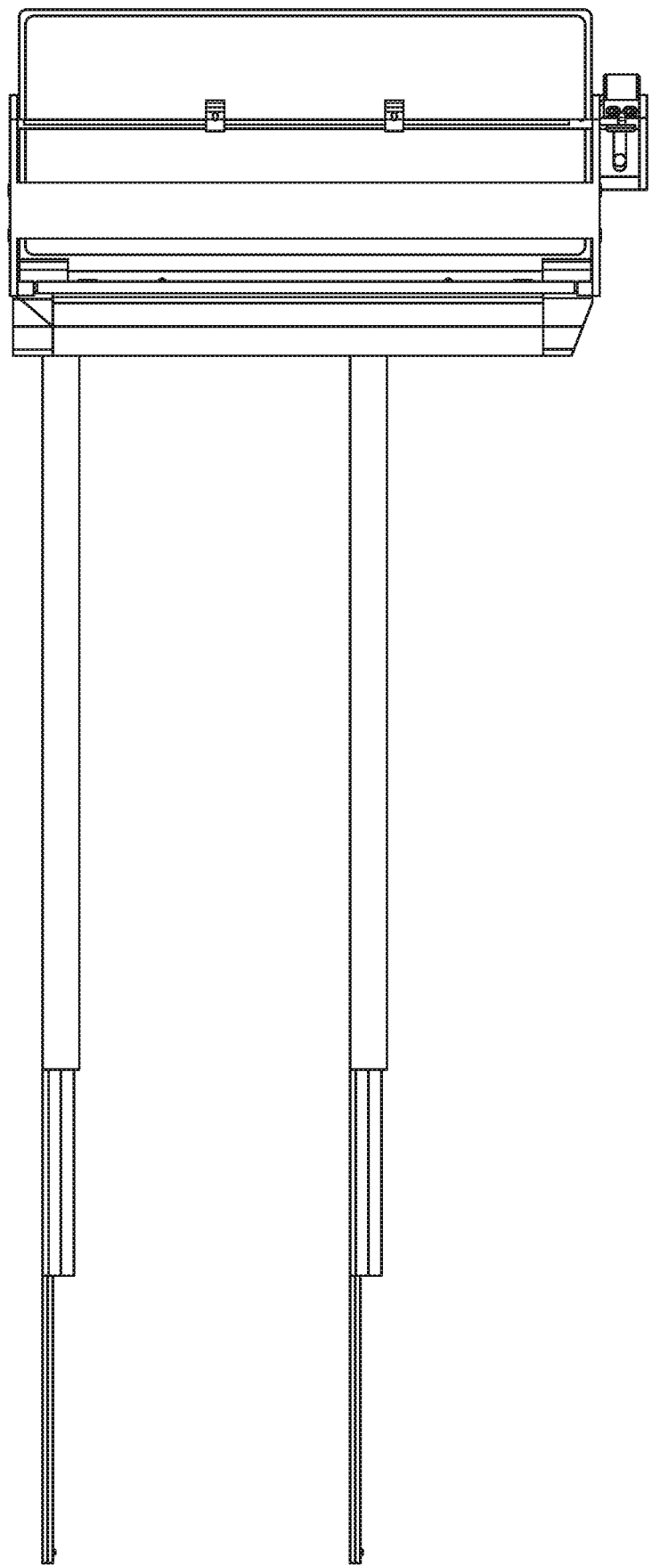

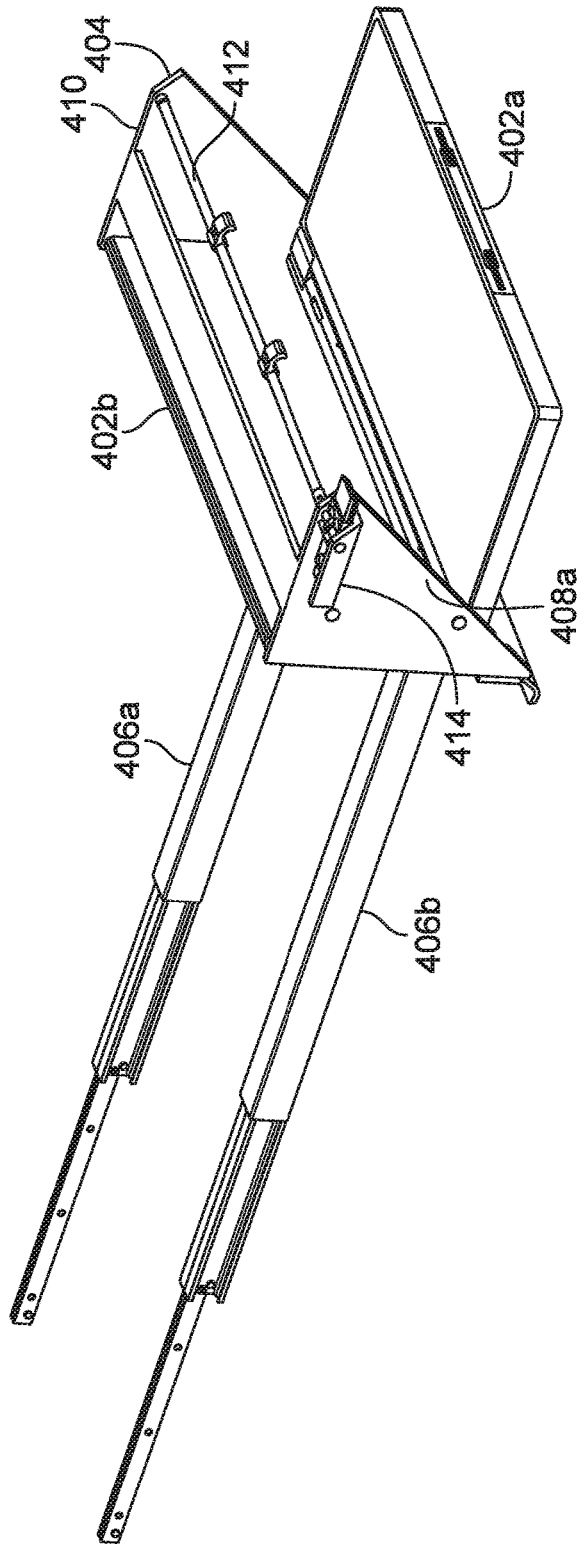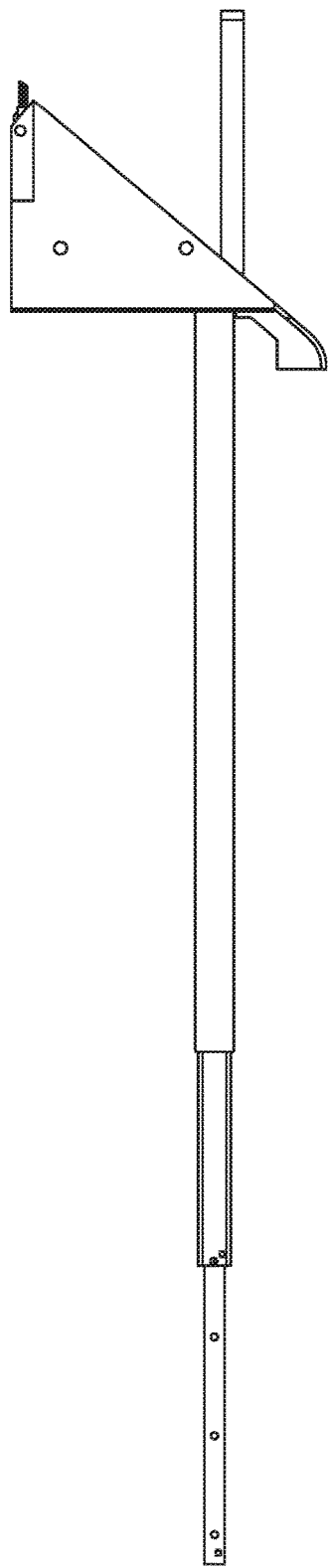
FIG. 4B
FIG. 4C

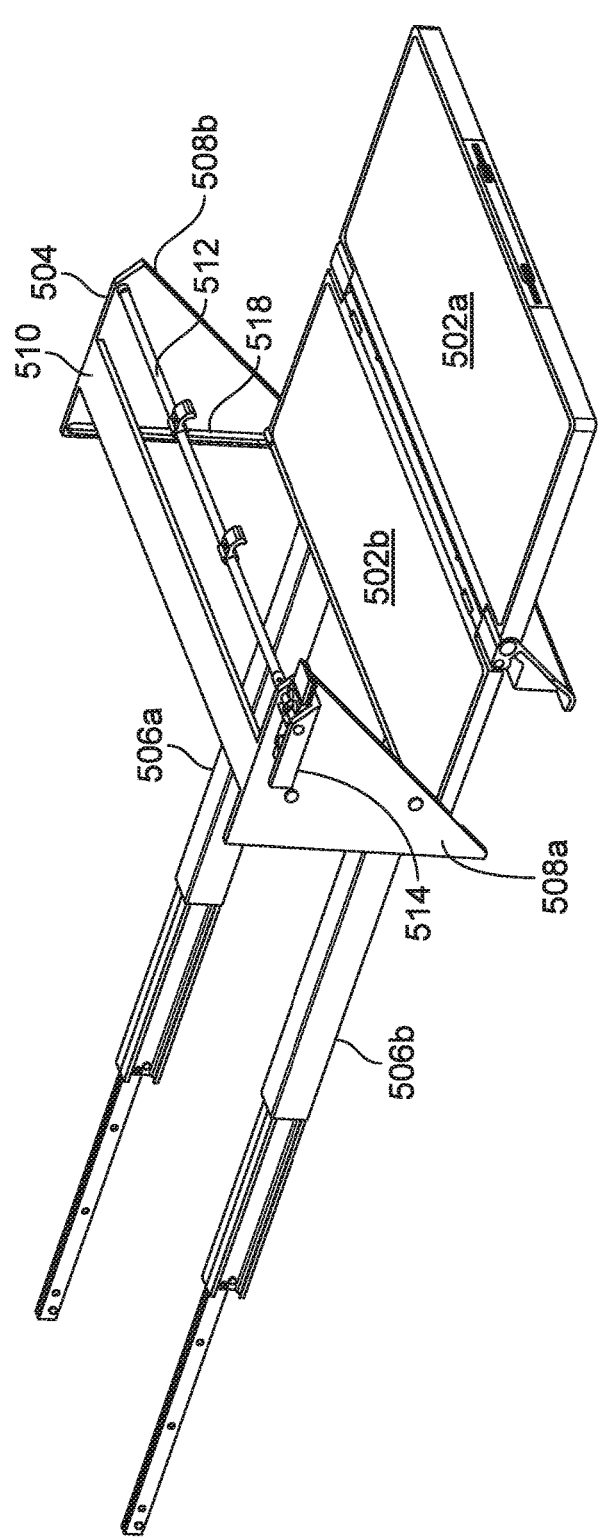
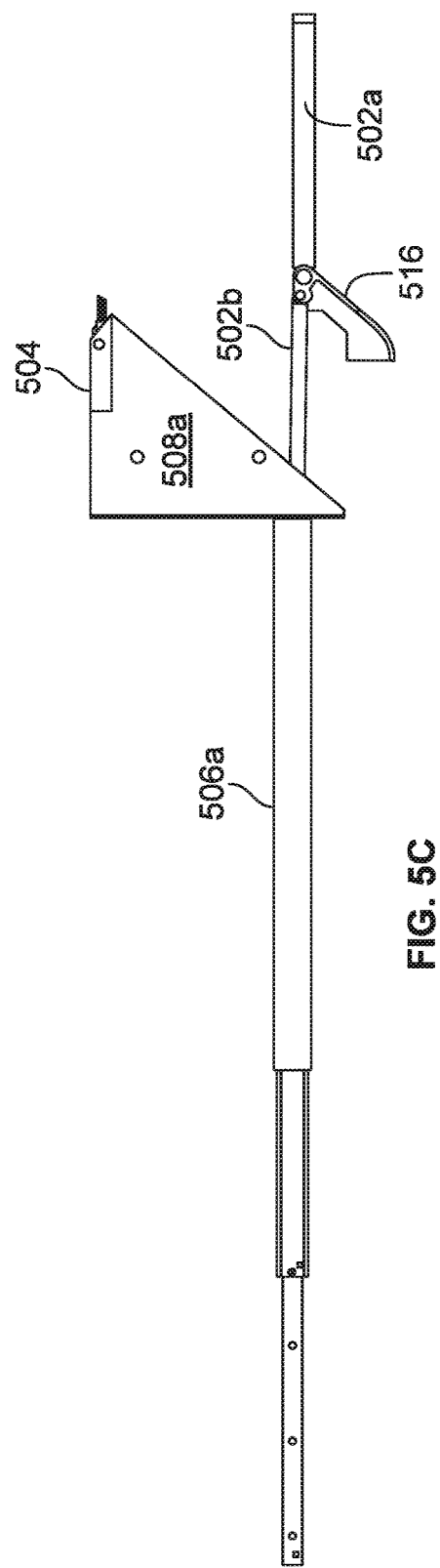
FIG. 5B
FIG. 5C

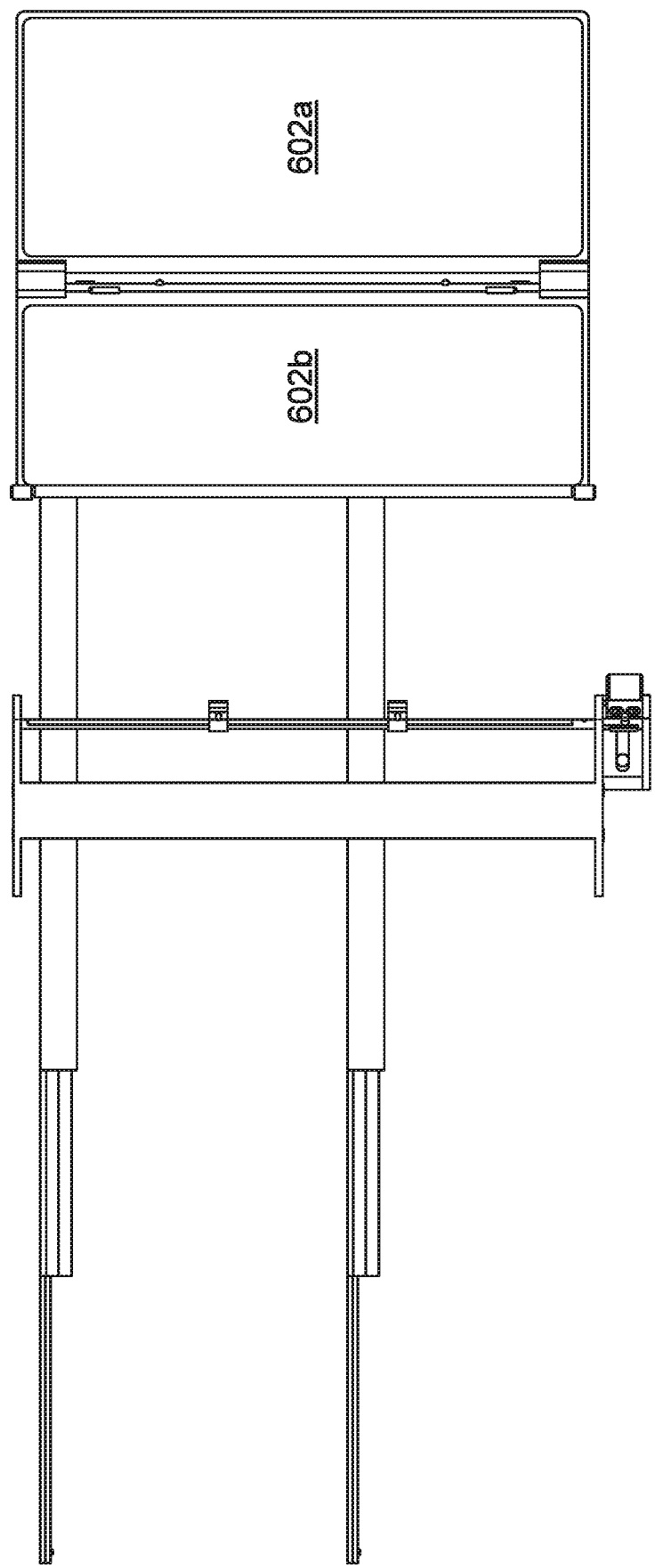

PASSENGER TRAY TABLE

RELATED APPLICATIONS

This application claims priority to U.S. Provisional Patent Application Ser. No. 62/480,818, entitled "Passenger Tray Table," filed Apr. 3, 2017, hereby incorporated by reference in its entirety. This application incorporates by reference, in their entirety, the following patent applications by B/E Aerospace, Inc. directed to passenger tray tables: U.S. patent application Ser. No. 15/097,361, entitled "Deployable Dining Table," filed Apr. 13, 2016; U.S. Pat. No. 9,573,687 entitled "Laterally-Expanding Tray Table," issued Feb. 21, 2017; U.S. Pat. No. 8,979,189, entitled "Cantilevered Tray Table and Aircraft Passenger Suite Including the Same," issued May 17, 2015; and U.S. Provisional Patent Application Ser. No. 62/317,937, entitled "Aircraft Passenger Seat with Tray Table Deployable from Lower Seat Back Area," filed Apr. 4, 2016.

BACKGROUND

Conventional tray tables typically extend the width of a seat back, and are moveable between a stowed position flush with and latched to the seat back of a seat and a deployed position with the tray table extending away from the seat back in a generally horizontal position for use by an aft-seated occupant. Other well-known designs include bi-fold tray tables that are hinged in the middle and are typically stowed in a folded configuration in an armrest. To deploy the table, the arm cap is raised, the table pivoted out of a storage cavity in the armrest, pivoted laterally across the lap of the seat occupant, after which the table is unfolded at the hinge to form a full width tray table.

The inventors recognized a need for a tray table that occupies minimal stowage space, affording seat designers to include additional amenities. The inventors further recognized a need for a tray table that, while still useful to a passenger, takes up less space than a standard tray table.

SUMMARY OF ILLUSTRATIVE EMBODIMENTS

In one aspect, the present disclosure relates to a passenger tray table with at least two table sections hingedly connected, the passenger seat tray table having a stowed mounting position against a fore positioned monument, where the passenger tray table stows at an angle relative to vertical, a top portion of the passenger tray table being closer to the passenger than a lower portion of the passenger tray table in the stowed position. In a first operative position, a front table section of the passenger tray table lowers into a horizontal position, while the second table section remains in the angled stowed position. In a second operative position, the front table section is disposed closer to the passenger while a rear table section of the passenger tray table is lowered to a horizontal position, in line with the front table section to provide a contiguous table surface. In a third operative position, the front table section and the rear table section extend closer to the passenger via a lateral extension mechanism.

The monument, for example, may include a class divider partition. In another example, the monument may include an aircraft suite panel. In a further example, the monument may include a wall of a galley monument or lavatory monument.

In some embodiments, a control such as a push button control causes automatic positioning of the passenger tray table from the stowed mounting position to the first operative position. While the passenger tray table is in the first operative position, the passenger may use the passenger tray table, for example to rest a beverage, or retain a small personal item such as a book or personal entertainment device (PED).

In some embodiments, a passenger pulls the front table section toward himself or herself, causing the passenger tray table to move from the first operative position to the second operative position. In the second operative position, the passenger may set larger items upon the tray table, such as a laptop computer.

In some embodiments, a passenger pulls the front table section further toward himself or herself, causing the passenger tray table to move from the second operative position to the third operative position. In the third operative position, the passenger may comfortably eat a meal set on the tray table or type on a laptop computer.

In some embodiments, a passenger pushes the front table section toward the monument, causing the passenger tray table to return to the first operative position from the second operative position or third operative position.

In some embodiments, a passenger lifts the front table section upward against the monument, causing the passenger tray table to return to the stowed position.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 3A through 6C illustrate overhead, side, and perspective views of folding tray table apparatus during various stages of deployment and extension;

DETAILED DESCRIPTION OF ILLUSTRATIVE EMBODIMENTS

Figure 1A:
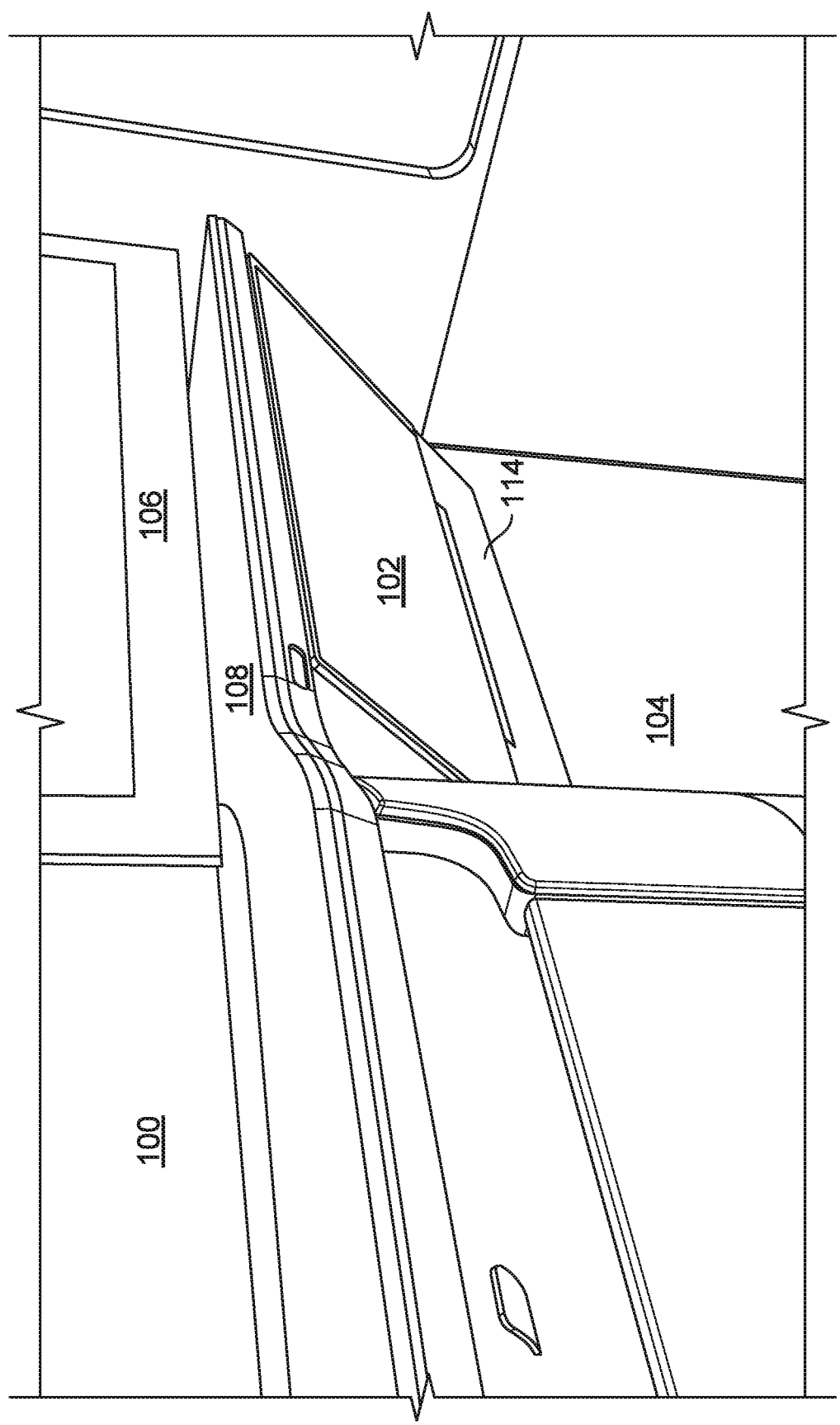
FIGS. 1A through 1C illustrate an example extendable, folding tray table in stowed, partially open, and fully open operative positions.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Figure 1B:
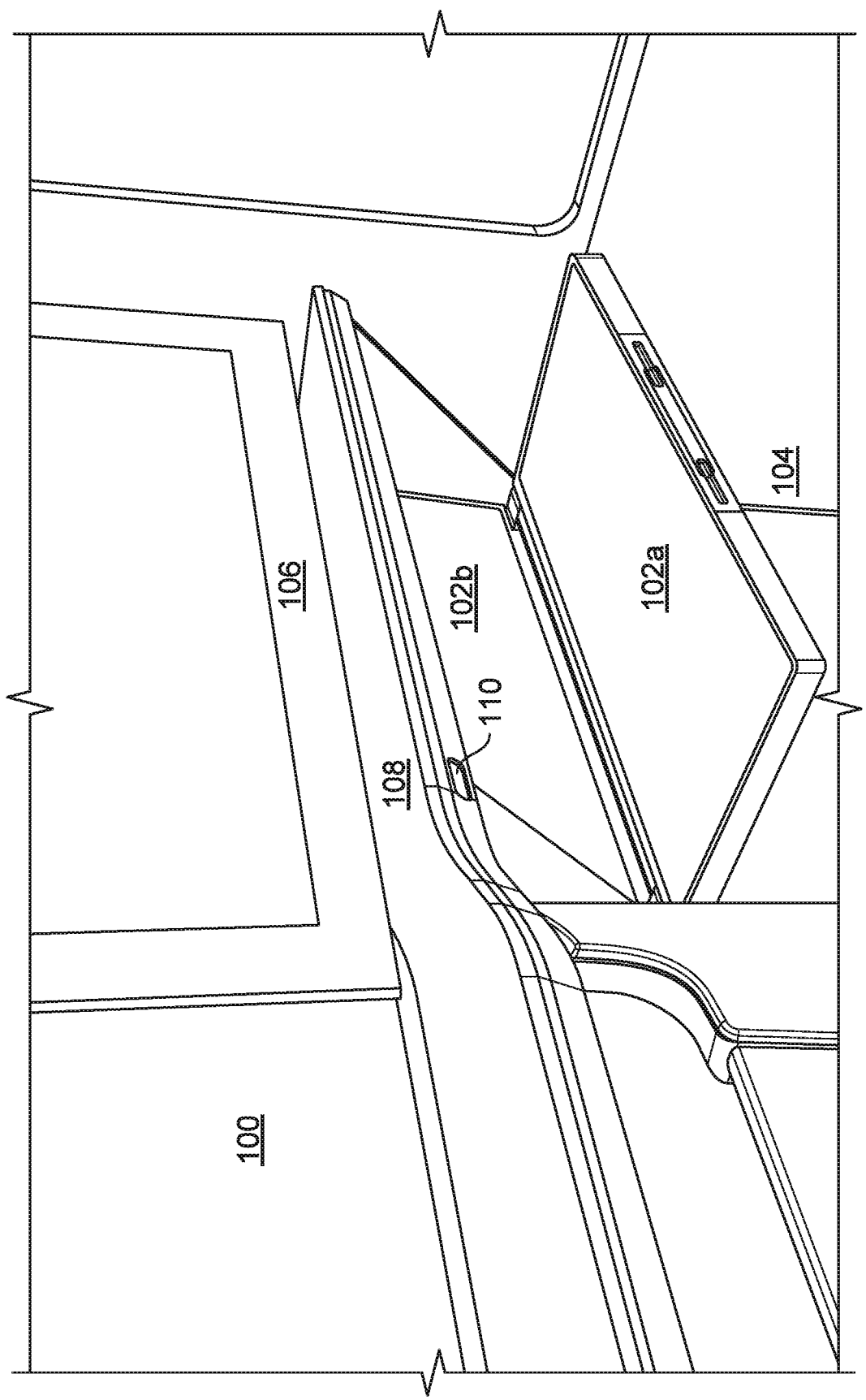
Figure 1C:
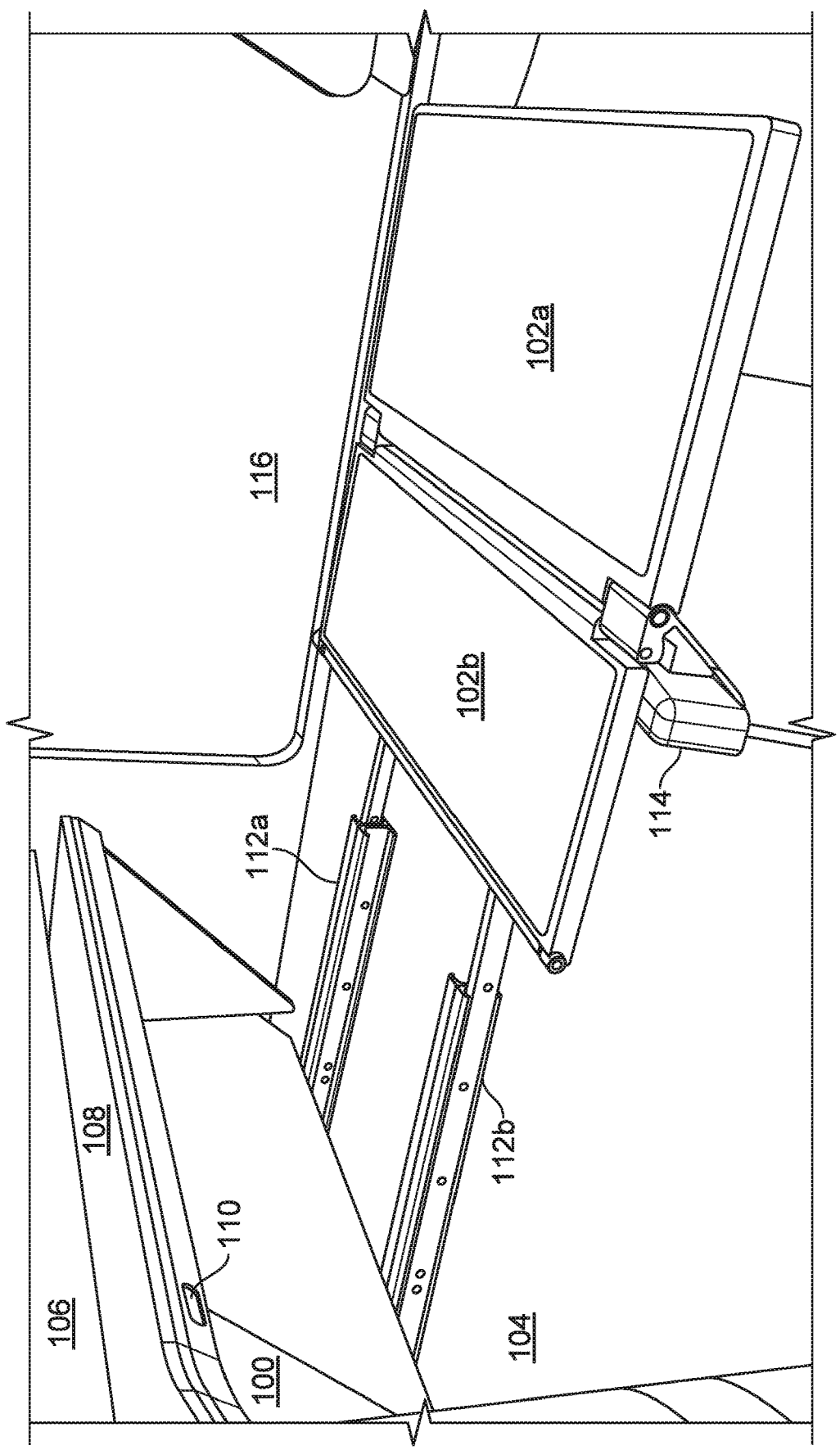

FIGS. 1A through 1C illustrate operational stages of an example tray table 102 mounted in a monument partition 100 of in an aircraft cabin in front of a passenger seat. The monument partition 100, for example, may be an aft wall of a lavatory or galley monument of the aircraft. In another example, the monument partition 100 may be a class divider partition, for example dividing coach class from business class or business class from luxury class. In a further example, the monument partition 100 may be a wall partition of an enclosed passenger suite.

As illustrated in FIG. 1A, the tray table 102 is mounted above a foot well region 104 and beneath a monitor 106. The tray table 102 is angled downward into the foot well region 104 and away from a passenger seated in a passenger seat, such that the tray table angles upward in connected with a ledge 108 beneath the monitor 106. As illustrated, the tray table 102 may be mounted at an angle approximately 30 to 40 degrees from vertical. In other examples, the passenger tray table 102 may be mounted between about 10 and 45 degrees from vertical. In other implementations, the tray table 102 may be mounted in a substantially vertical position (e.g., against a flat monument partition surface).

Figure 3A:
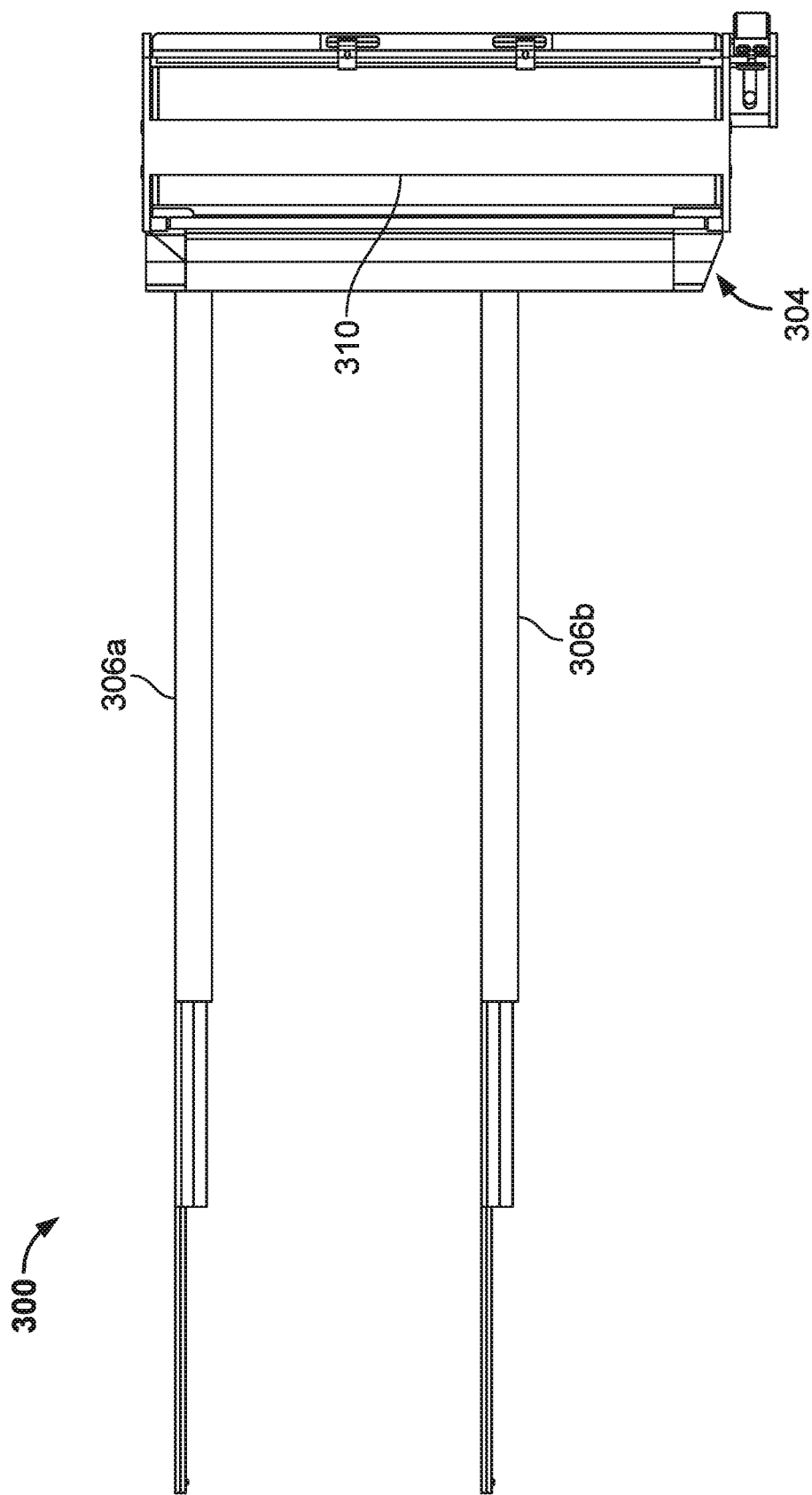
Figure 3B:
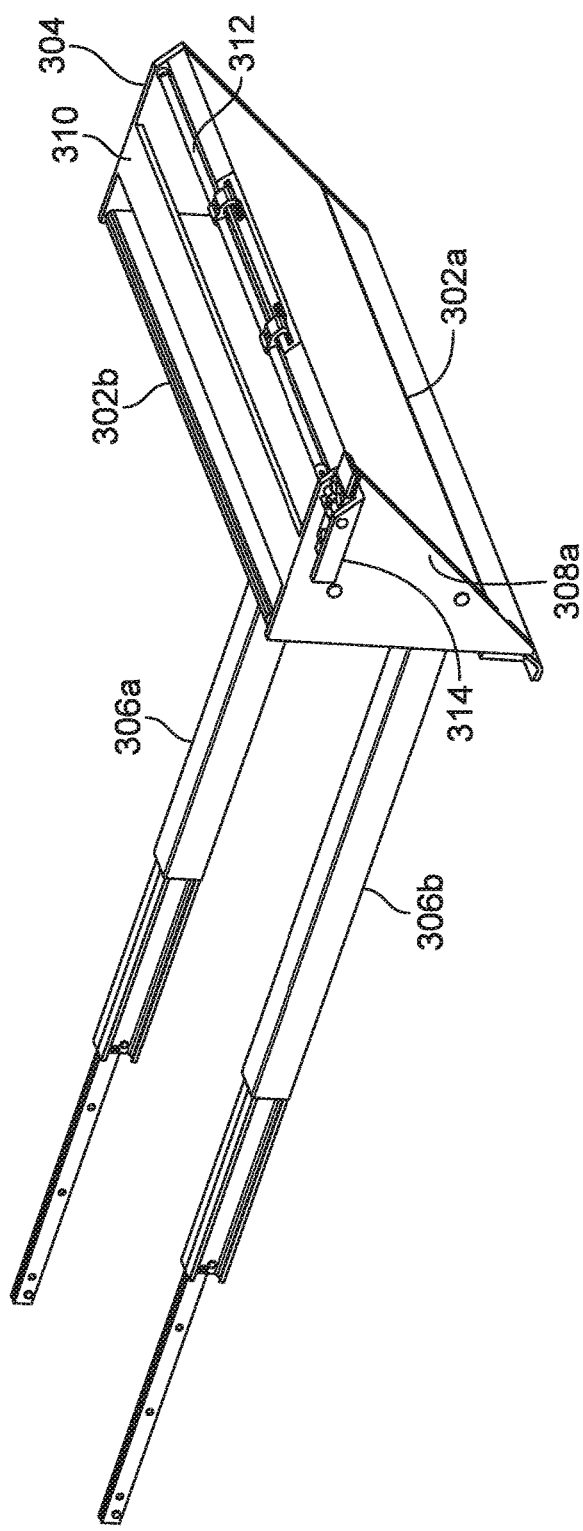
Figure 3C:
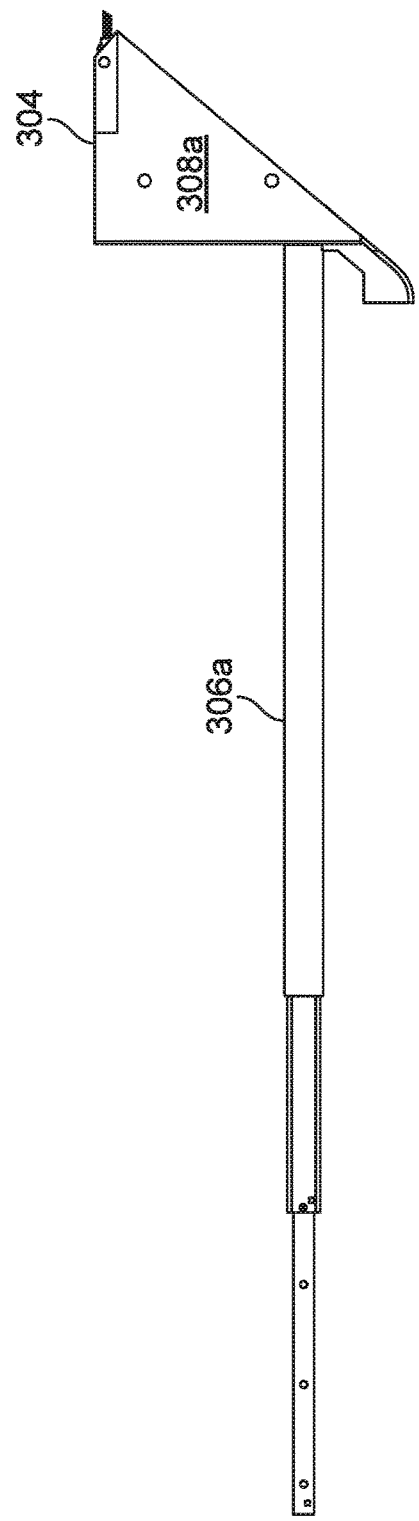

As illustrated in FIGS. 3A through 3C, in certain embodiments in the stowed position, tray table apparatus 300 includes a tray table portion 302 angled in line with an outward facing portion of a partition mount 304, while linear extension members 306 are in a retracted position. The partition mount 304, in some implementations, includes two triangular side walls 308 for aligning a second table section of the tray table 302b vertically with a vertical edge of the triangular side walls 308 and a first table section of the tray table 302a at an angle with an angled edge of the triangular side walls 308 within the partition mount 304. The triangular side walls 308, for example, may bolt or screw to the partition 100 of FIG. 1. Further, the partition mount includes a rigid top member 310 (see also 510 in FIG. 5B and 610 in FIG. 6B, for example) connecting the two triangular side walls and maintaining relative position thereof. A locking mechanism 312 may be positioned forward of and parallel to the rigid top member 310, with a lock release mechanism 314 mounted against one of the triangular side walls 308. An aesthetic shroud, in some implementations, mounts on the face of the partition mount 304, for example to conceal the locking mechanism 312 and lock release mechanism 314.

In other implementations, the partition mount may be more rectangular in shape, for example where the tray table is mounted vertically rather than at an angle. In further embodiments, the partition mount may have a curved shape to follow curves of a monument wall. The partition mount, in embodiments involving automated deployment, may include electronics such as a wireless receiver to receive a control signal from a passenger seat control indicating, in some examples, deployment into the first operative position, extension into the second and/or third operative position, or retraction from the second or third operative positions.

In some implementations, as illustrated in FIG. 3A, the linear extension members 306a, 306b are offset from a longitudinal axis of the partition mount 304. For example, the first linear extension member 306a, which may be mounted proximate a side wall of the aircraft cabin is proximate a first edge of the partition mount 304, while the second linear extension member 306b, which may be mounted proximate an opposite end of the foot well (e.g., footwell 104 of FIG. 1A), may be mounted closer to the longitudinal axis of the partition mount 304 than the first extension member 306a. For example, to fit within the footwell region of the passenger suite, the extension members 306a, 306b may need to be shifted laterally to avoid interfering with other structures within the passenger region. In another example, the extension members 306a, 406b may be shifted laterally from a central position to avoid interference with a passenger, for example upon crossing his or her legs while using the tray table 300.

Turning to FIG. 1B, the tray table 102 is in a first operative position with a first table section 102a lowered into a substantially horizontal position. As can be seen, the steeper the mounting angle of the passenger tray table 102, the greater access the passenger is afforded for utilizing the surface of the first table section 102a when in the first operative position.

To move from the stowed position to the first operative position, in some implementations, the passenger may select a control mounted proximate the tray table 102 or proximate the passenger seat. As shown in FIG. 1B, the passenger may actuate a button 110 to cause the tray to move to the first operative position. For example, upon depression of the button 110, a locking mechanism mounted beneath the ledge 108 may release from a complementary locking mechanism on the edge of the first table section 102a, allowing gravity to move the first table section 102a into the first operative position.

As shown in FIGS. 4A through 4C, in the first operative position, in some implementations a first table section 402a extends from within a partition mount 404, while a second table section 402b remains stowed substantially vertical and in line with a rear portion of the partition mount 404. A set of linear extension members 406 remain in a retracted, stowed position.

Figure 2A:
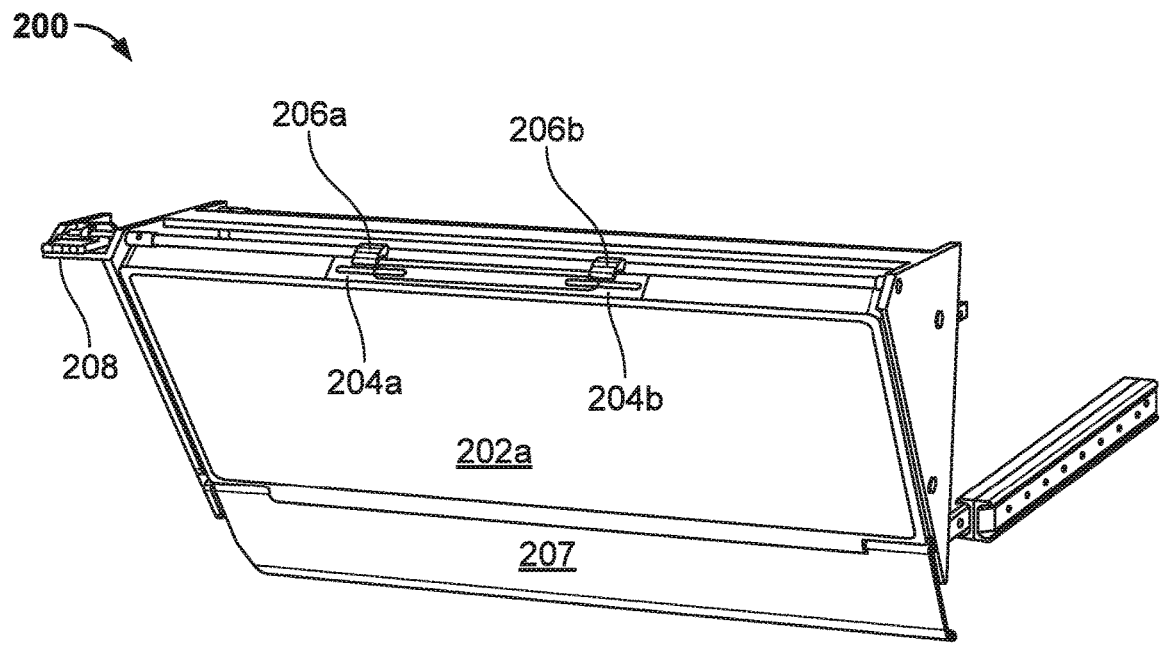
FIGS. 2A through 2J illustrate stages of deployment and extension of an example folding tray table.
Figure 2B:
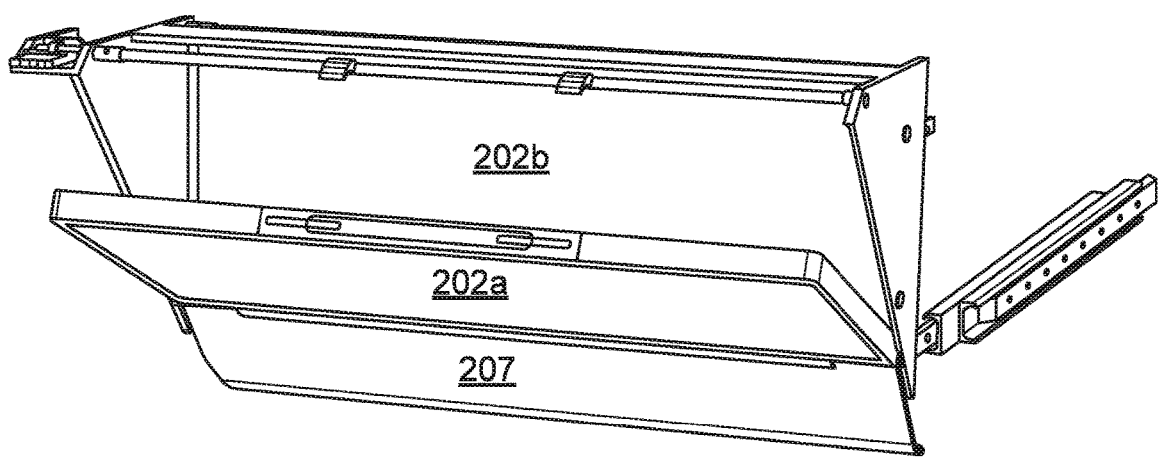
Figure 2C:
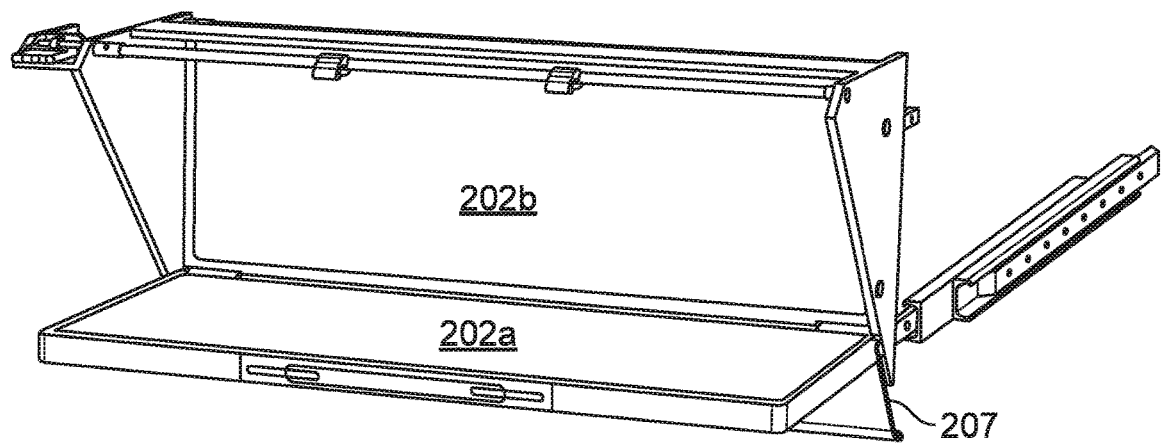
Figure 2D:
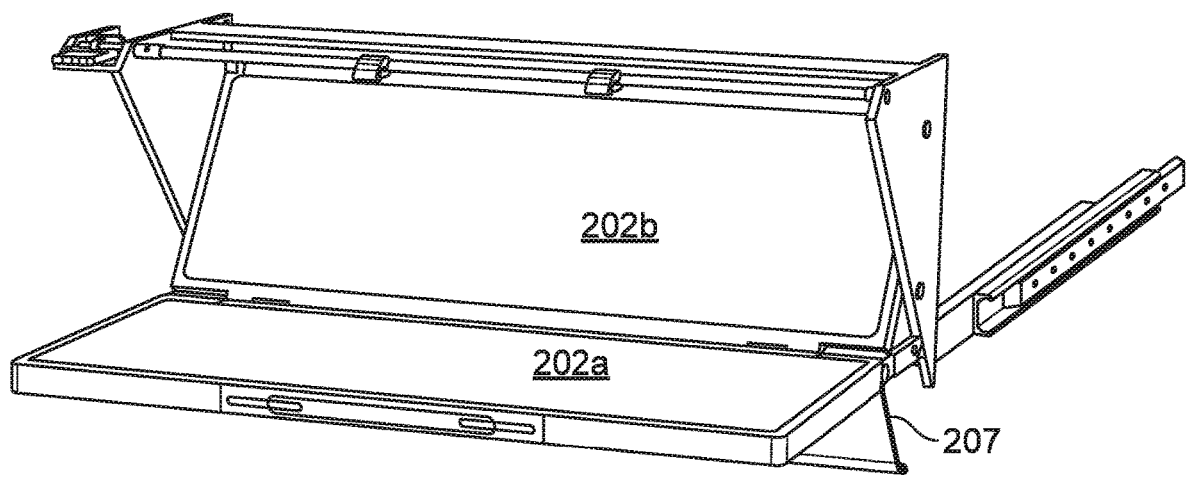
Figure 2E:
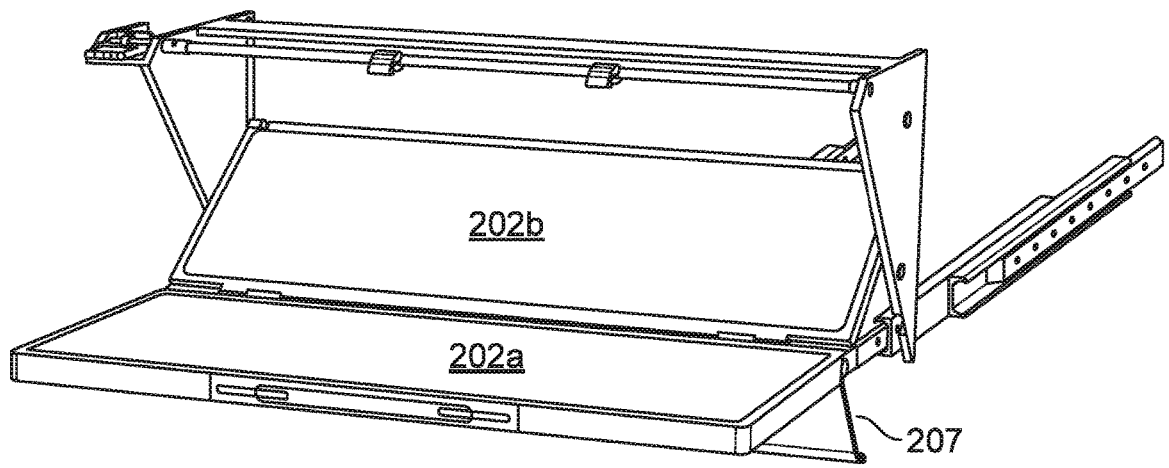
Figure 2F:
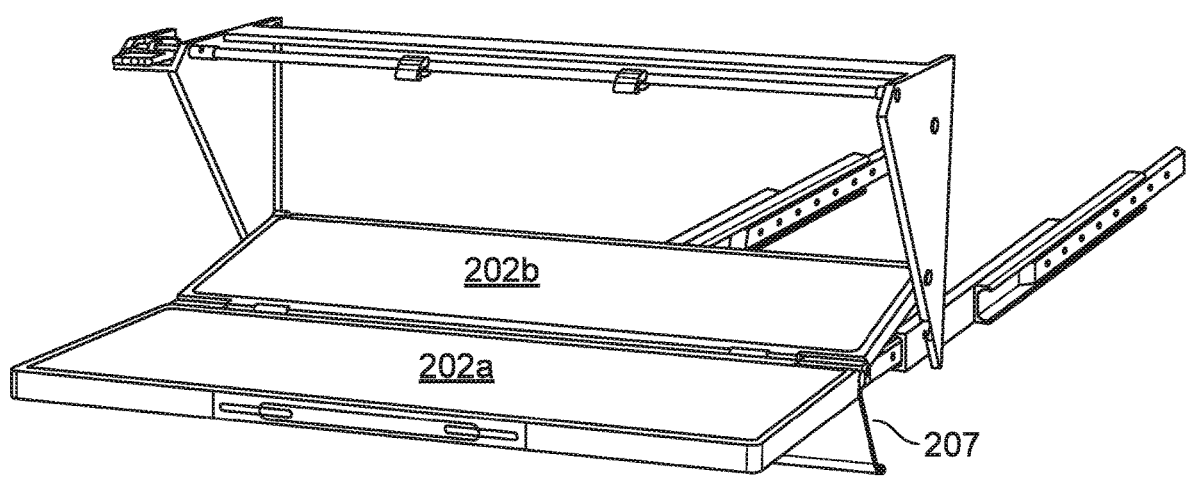

Turning to FIGS. 2A through 2C, a locking mechanism for a tray table apparatus 200 may include a set of locking clips 206 configured to mate with corresponding locking apertures (or depressions) 204 disposed on a front edge of the table section 202a. Actuation of a release button 208 coupled to the clips 206 may cause release of the clips 206 from the locking apertures 204, thereby allowing gravity to pull table section 202a downwards and exposing a second table section 202b (see FIG. 2B) until reaching a horizontal position (see FIG. 2C). A stabilizing member 207, for example, sits at a hinge region 209 between the first table section 202a and the second table section 202b. the stabilizing member 207, for example, may provide stability to the first tray table section 202 while in the first operative position.

Returning to FIG. 1B, the first table section 102a, as shown, is hingedly connected to a second table section 102b. To control deployment of the tray table 102 into the first operative position, in some implementations, the first table section 102a and the second table section 102 may be rotatably connected by at least one viscous rotary dampener. In another example, the first table section 102 and the second table section 102b may be coupled at least in part by at least one friction bushing, such as the friction bushing described in U.S. patent application Ser. No. 15/274,142 entitled "Friction Bushing" and filed Sep. 23, 2016, incorporated herein by reference in its entirety.

In the first operative position, the second table section 102b remains stowed in the same angular position against the monument partition 100. To control the angle of deployment of the first table section 102a into horizontal position (e.g., as opposed to dropping further vertically), in some implementations, at least one linear extension member is coupled to the first table section 102a and maintains the horizontal position of the first table section 102a. The at least one linear extension member, for example, may be configured to accept static loads upon the first table section 102a, in the first operative position, of at least 2 pounds, at least 5 pounds, or up to 10 pounds.

Further, in some implementations, the stabilizing member 114 proximate and beneath a hinge region between the first table section 102a and the second table section 102b in a substantially vertical direction may prevent each of the first table section 102a and the second table section 102b from dropping down below a horizontally deployed position. Further, the stabilizing member 114 may contribute to the strength and resilience of the tray table 102, allowing the tray table 102 to accept greater static and dynamic loads, both in a partially extended position (e.g., the first operative position) and in a fully extended position (e.g., at least a second operative position).

In other implementations, the first table section 102a and the second table section 102b are hingedly connected by a detent hinge designed to maintain the first table section 102a in the first operative position despite forces such as loads presented by the user, turbulence, and vibrations. For example, the first table section 102a and the second table section 102b may be connected by at least one detent hinge configured to accept static loads, in the first operative position, of at least 2 pounds, at least 5 pounds, or up to 10 pounds.

To maintain the second table section 102b in the stowed position while the first table section 102a is in the first operative position, in some implementations, a detent lock of the at least one linear extension member disallows lateral extension of the first table section 102a. In other implementations, a secondary locking mechanism may retain the second table section 102b in the stowed position.

As illustrated, in the first operative position, the passenger is presented with limited table area for placing beverages and other personal items. Further, due to the ledge 108 and the angle of connection with the second table section 102b, the passenger is presented with limited clearance for setting down taller items, such as a full-sized water bottle. However, the passenger retains adequate clearance area for exiting the passenger seat while the tray table 102 remains in the first operative position. Thus, in the first operative position, the passenger may set a beverage on the first table section 102a while moving into the aisle region. Further, in the first operative position, the passenger has unobstructed access to the foot well 104. For example, the passenger may articulate or extend the passenger seat from an upright position into a reclined, lounge, or even lie flat position while the tray table 102 is deployed in the first operative position.

To obtain additional table area, the passenger may move the tray table 102 into a second operative position where the first table section 102a and the second table section 102b are each horizontally deployed, creating a contiguous table space. Movement from the first operative position (FIG. 2D) to the second operative position (FIG. 2G), for example, is illustrated in FIGS. 2D through 2G.

To move the tray table 102 into the second operative position, in some implementations, the passenger pulls the first table section 102a towards himself or herself. At least one extension member, for example, may guide the first table section 102a toward the passenger while the second table section 102b is moved away from the monument partition 100, dropping the edge of the second table section 102b furthest from the first table section 102a along the mounting position and into a horizontal position.

In other implementations, to move the tray table 102 into the second operative position, the passenger may actuate an additional control or the same control to cause forward movement of the first table section 102a, bringing the second table section 102b down to horizontal position due to the hinged configuration. For example, an electrical linear actuator may automatically drive the tray table into the second operative position upon actuation of a user control. In another example, a spring mechanism such as a gas spring or coil spring may be released upon actuation of a control, urging the tray table 102 into the second operative position.

Figure 2G:
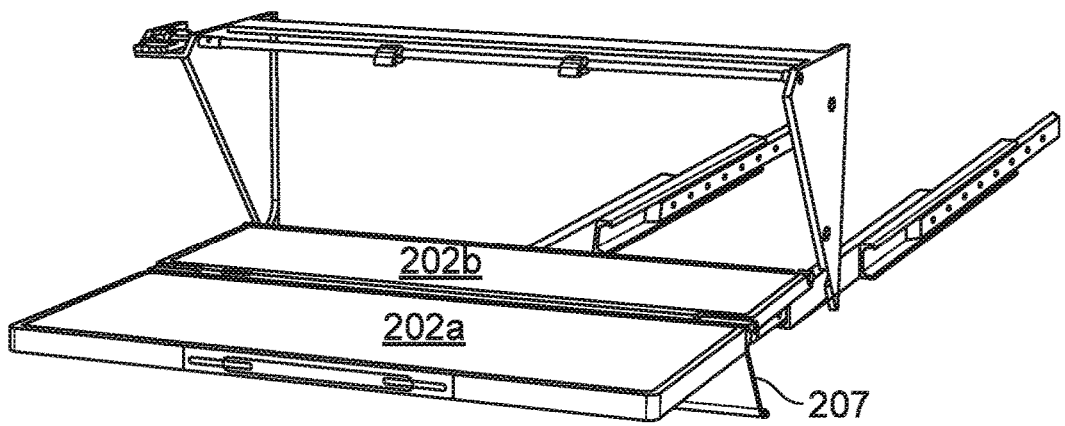

Note that, as shown in FIG. 2G, a rear portion of the tray table 102 furthest from the passenger is still disposed beneath the ledge 108 while in the second operative position. However, in this position, the passenger will be provided additional table area for setting personal items while still being seated at a distance from the tray table 102. For example, in the second operative position, due to clearance between the tray table 102 and the passenger seat, the passenger could set an open laptop computer on the tray table 102a while comfortably using a separate keyboard, set in the passenger's lap, to do work. Further, a smaller passenger may have clearance to exit the passenger seat without moving the tray table 102 back into the first operative position. In addition, the passenger may continue to comfortable sit in a reclined or lounge position while the tray table 102 is in the second operative position.

Figure 5A:
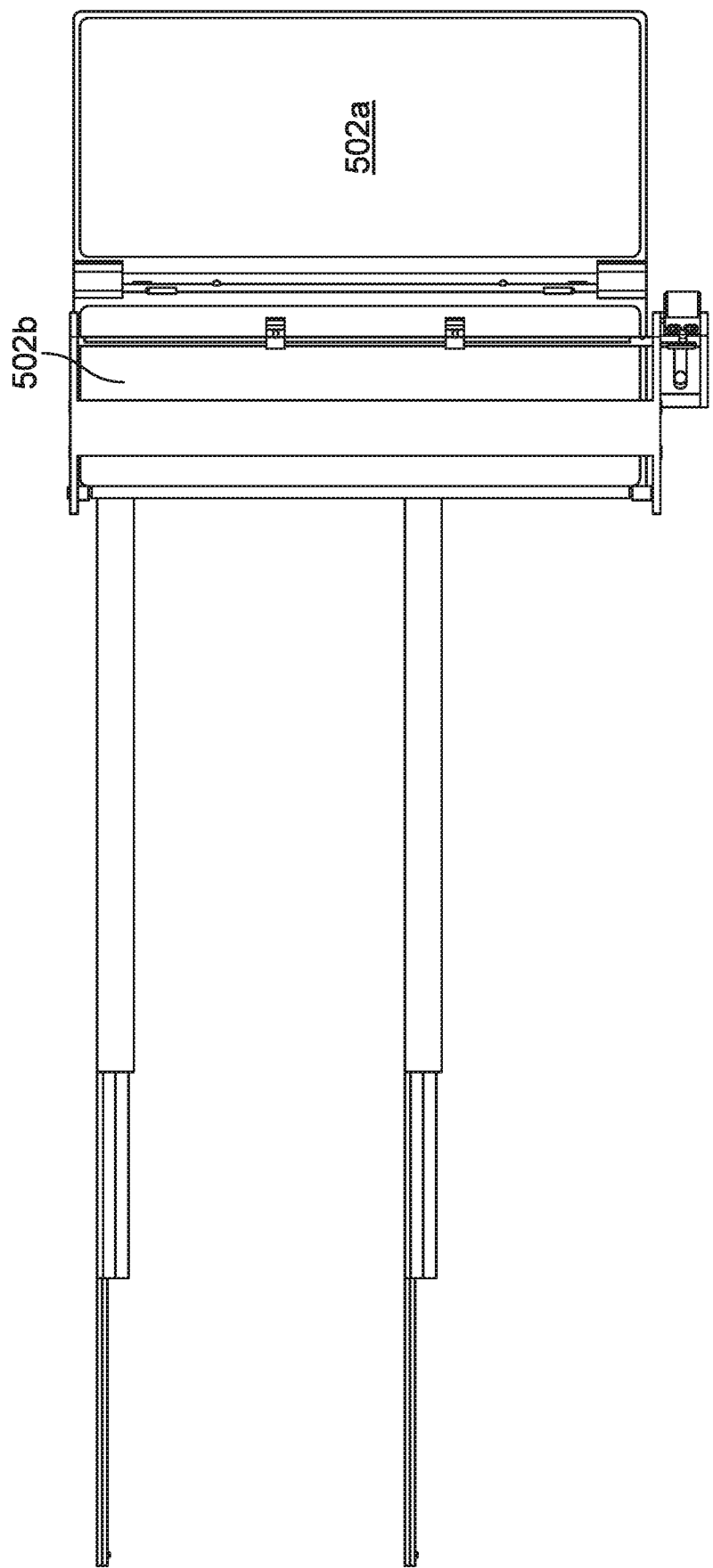

Turning to FIGS. 5A through 5C, in certain embodiments in the second operative position, the majority of a second table section 502b remains within a partition mount 504 (e.g., beneath and behind a locking mechanism 512 such that the majority of the second table section 502b is positioned beneath the partition mount 504), while a first table section 502b is fully extended beyond the partition mount 504. In deploying into the horizontal position, turning to FIG. 5B, the second table section 502b, in some embodiments, slides down a guide member 518 mounted to triangular side wall 508b. The opposing side (e.g., along an inner surface of triangular side wall 508a) may have a matching guide member 518 for ensuring controlled movement of the second table section 502 into the deployed position. In other implementations, the guide member 518 may differ in style than an opposing guide member. For example, as illustrated, the guide member 518 is a guide rail, such as a metal guide rail in which a pin or a rounded corner of the table section 502b may slide down. A full extent of such a guide rail, for example, may be viewed in FIG. 6B at guide member 618. In some implementations, a paired guide member on the opposing side may be a bearing guide such that bearings may allow for a smoother transition of the table section 502b from stowed to deployed position. Conversely, to avoid rapid deployment and control movement of the table section 502b from the stowed to the deployed position, both sides may be configured as guide rails.

Turning to FIG. 5C, a stabilizing member 516 is moved forward by extension members 506, maintaining a hinge position between the first table section 502a and the second table section 502b and providing additional load capability to the tray table 502. The extension members 506 are now in a partially extended position.

In other implementations, the stabilizing member 516 (e.g., stabilizing member 114 of FIG. 1) is configured for hinged movement upon deployment of the first table section and the second table section into the first operative position. For example, to avoid injuring a passenger when crossing his or her legs beneath the tray table 502, the stabilizing member 516 may be configured to hinge upward and backward against a bottom surface of the second tray table section 502b upon impact by an object, such as a leg, knee, or foot of a passenger.

To actively use the tray table 102, for example as a meal table or for typing directly onto a laptop computer, the tray table 102, in some implementations, is configured for deployment in a third operative position, illustrated in FIG. 1C. Turning to FIG. 1C, in some implementations, a pair of linear extension members 112 are in a fully extended position, moving the tray table 102 beyond the ledge 108 and proximate a seated passenger.

Figure 6B:
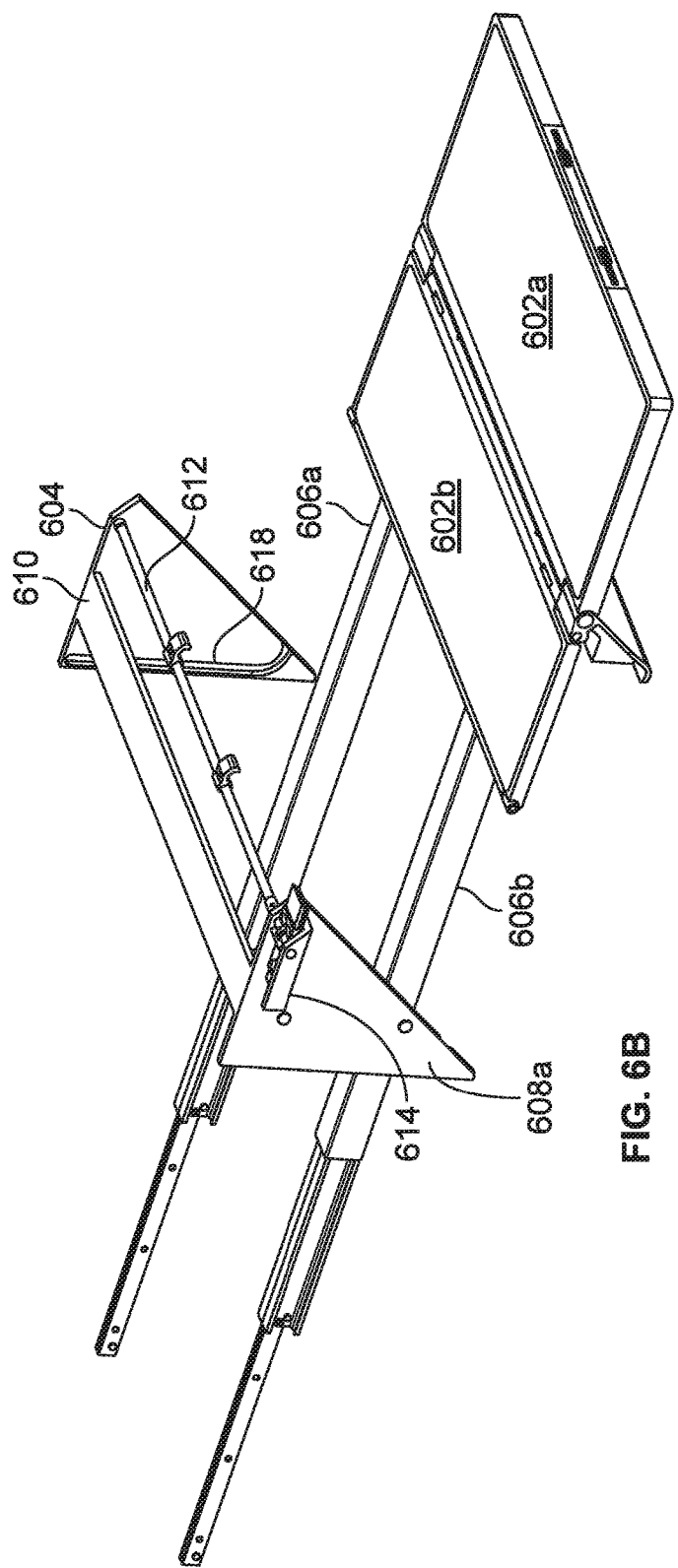
Figure 6C:
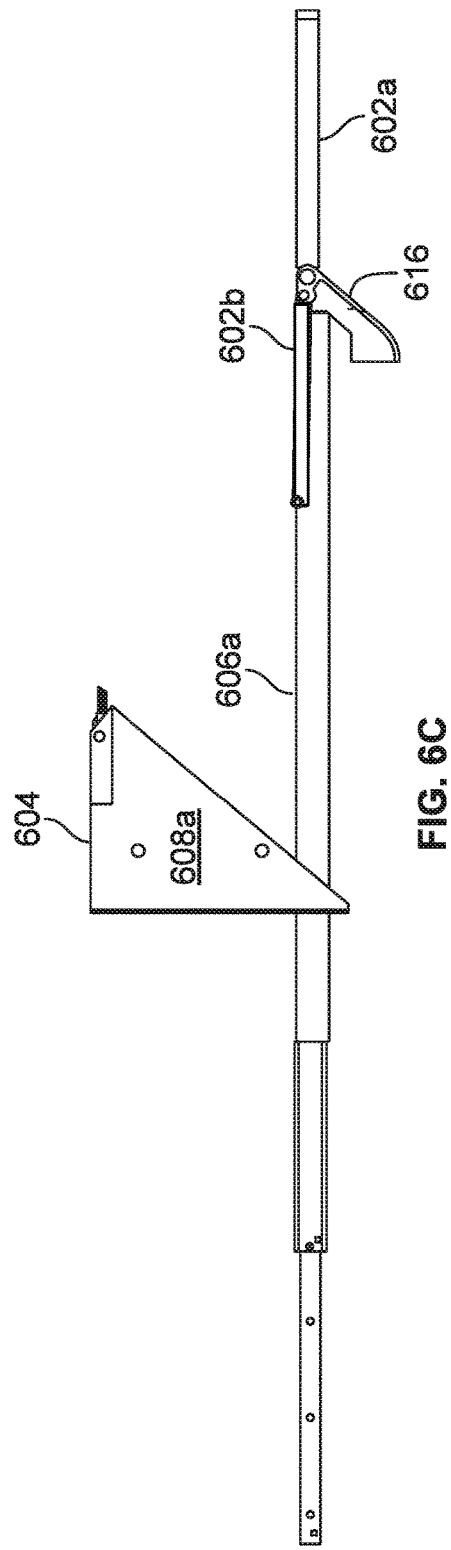

Turning to FIGS. 6A through 6C, in certain embodiments in the third operative position, the entire tray table 602 (table section 602a and table section 602b) are extended well beyond a partition mount 604. A set of linear extension members 606 are in the fully extended position.

Returning to FIG. 1C, the linear extension members 112, as illustrated, include slideably connected guide rails. In other embodiments, sets of linear bearings may be used to extend the tray table 102 from the first operative position through the third operative position.

Figure 2H:
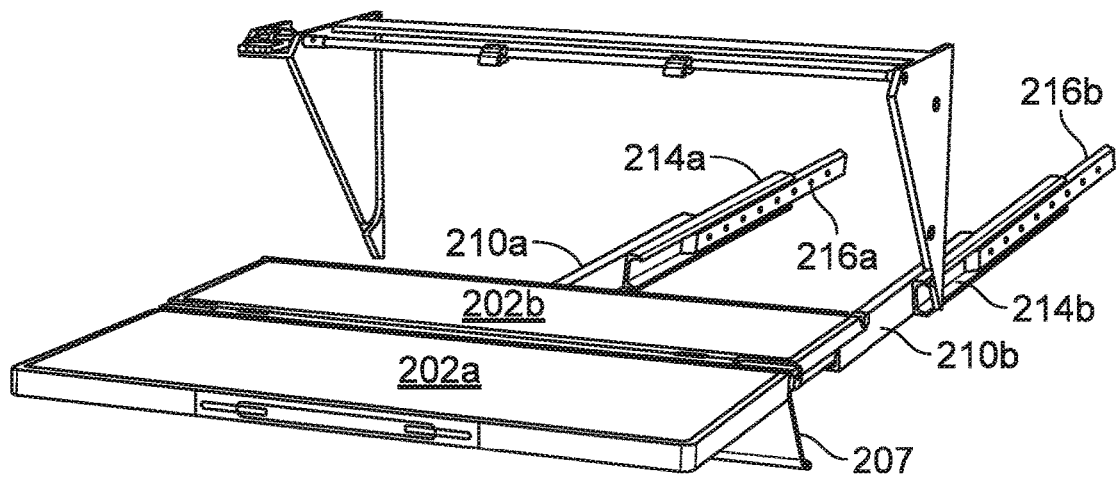
Figure 2I:
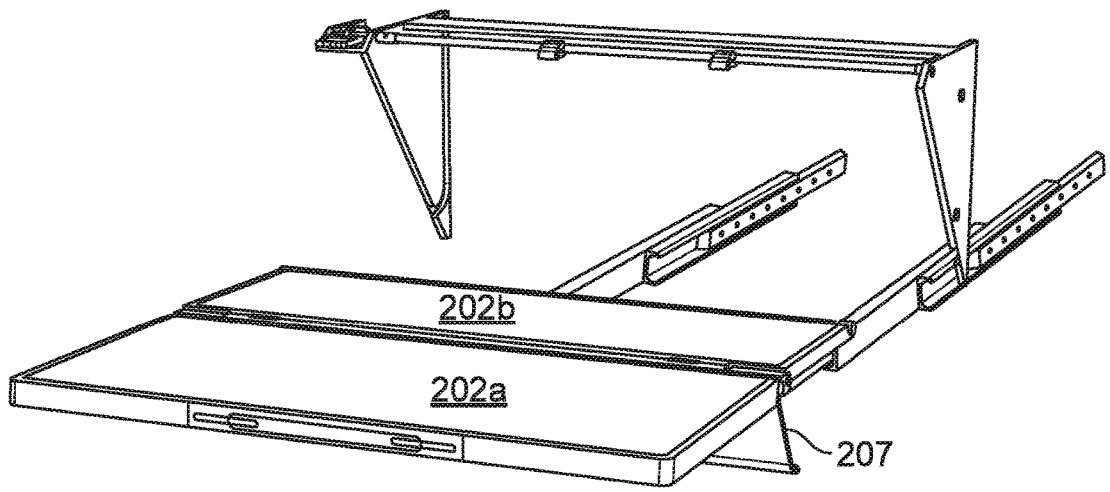
Figure 2J:
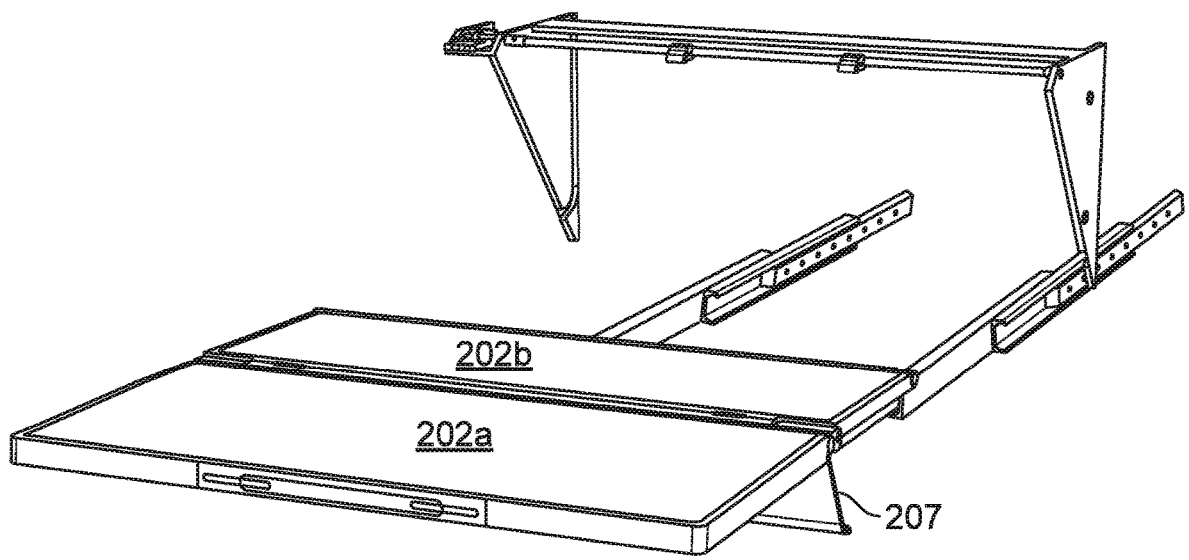

For example, turning to FIGS. 2H through 2J, the linear extension members 112 may be designed as sets of slideably coupled extension rails 214, 216. Extension rails 216a, 216b, for example, may be fixed to the monument partition 100 (see FIG. 1), while extension rails 214a, 214b are fixedly coupled to extension arms 210. The extension arms 210, in turn, may be fixedly connected to the second table section 202b.

In other embodiments, the linear extension members 112 may include, rather than apparatus mounted to and extending from the partition monument 100, apparatus mounted to a side panel 116. For example, a side-mounted guide rail with at least one extension arm (e.g., a stabilizing member) may direct the tray table 102 from the second operative position to the third operative position. As shown, a portion of the second table section 102b is disposed above a portion of the linear extension members 112.

Additionally, as illustrated in FIG. 1C, a stabilizing member 114 is illustrated positioned beneath table section 102b and coupled to table section 102a. The stabilizing member 114, for example, may be positioned beneath table section 102b in stowed position (see FIG. 1A). In the stowed position, the stabilizing member 114 may provide an additional benefit of scuff protection to the tray table 102 (e.g., blocking edge damage to the tray table 102 from a passenger's feet within foot well 104).

Figure 7A:
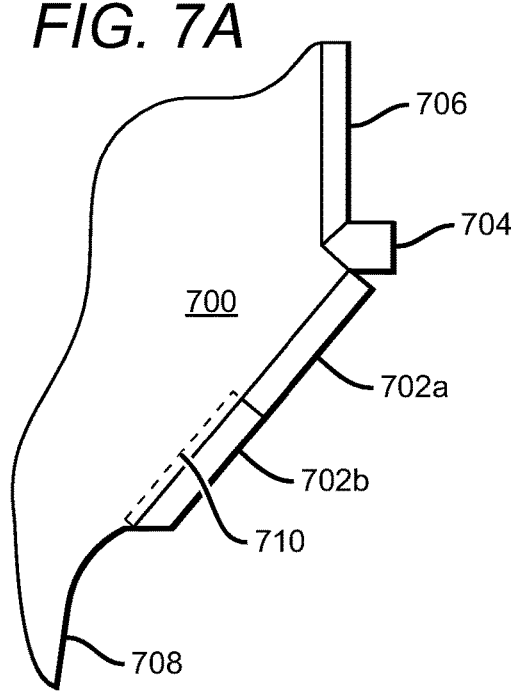
FIGS. 7A through 7C illustrate an example pocket deploying folding tray table.
Figure 7B:
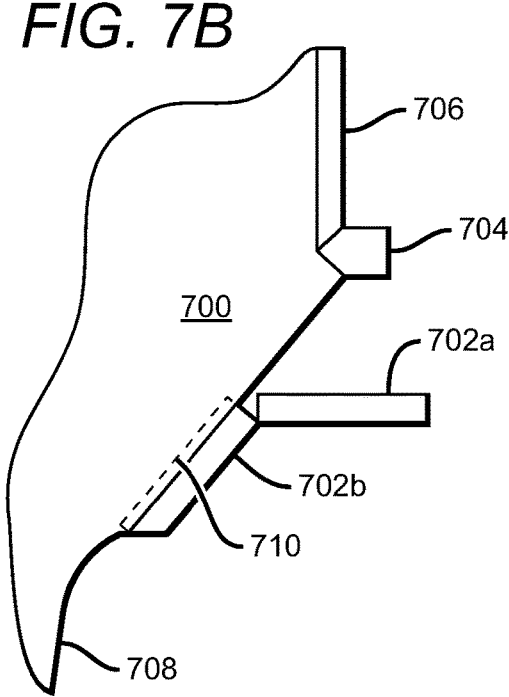
Figure 7C:
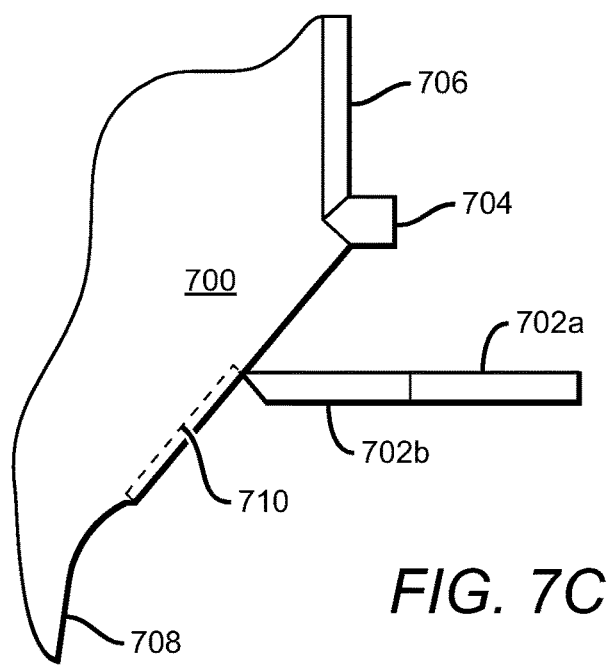

FIGS. 7A through 7C illustrate a folding tray table according to an alternative embodiment, where the tray table can deploy into two operative positions. Turning to FIG. 7A, in some embodiments, a first table section 702a and a second table section 702b are mounted against a monument partition 700 beneath a ledge 704 and a monitor 706 and above a foot well 708. The foot well 708, in this embodiment, may be shorter than the foot well depicted in FIGS. 1A through 1C because the tray table sections 702a, 702b do not fold against each other in the stowed position. Although the monument partition 700 is illustrated as being angled, in other embodiments, the tray table design of FIGS. 7A through 7C may mount against a vertical surface.

Turning to FIG. 7B, in a first operative position, the first table section 702a unlocks from the stowed position against the monument partition 100 and drops to a horizontal position beneath the ledge 704, similar to the movement of the first table section 102a as described in relation to FIG. 1B. The first table section 702a, for example, may be releasably attached to the monument partition using complementary latching mechanism connected to the tray table 702a and at least one of the monument partition 700 and the ledge 704. In some implementations, the ledge 704 includes a drop-down lip or shield which prevents the first table section 702a from moving into the first operative position of FIG. 7B. Actuation of the release mechanism may be mechanical and/or electrical. For example, a signal transmitted from a control mounted proximate to the passenger seat may cause actuation of a mechanical release, moving the first table section 702a into the first operative position. The movement of the first table section 702a into the first operative position may be controlled by a dampening mechanism, such as a viscous rotary dampener or friction bushing.

Turning to FIG. 7C, in some implementations, the tray table 702 is configured for deployment in a second operative position where the first table section 702a and the second table section 702b provide a contiguous horizontal table surface. While in moving between the first operative position and the second operative position, for example, the first table section 702a may be lifted upward toward the ledge 704, allowing the second table section 702b to reach a top of a guide member 710 and hinge into a horizontal position. To move the tray table 702 from the first operative position of FIG. 7B to the second operative position of FIG. 7C, for example, the second table section 702b may be guided upward along the guide member 710 until hinging outward into the second operative position of FIG. 7C. The guide member 710, in some embodiments, is a guide rail. In some embodiments, to provide for less friction and thus assist in manual deployment of the tray table 702, the second table section 702b may be guided upward along a bearing track 710. To lower costs and weight while benefiting from the lower friction of the guide rail, in further embodiments, one side of the guide member 710 may be a guide rail while the other side of the guide member 710 may be a bearing track. In some embodiments, an assist mechanism, such as a coil spring or motorized linear actuation mechanism, may assist in moving the second table section 702b from the bottom of the guide member 710 to the top of the guide member 710.

Figure 8A:
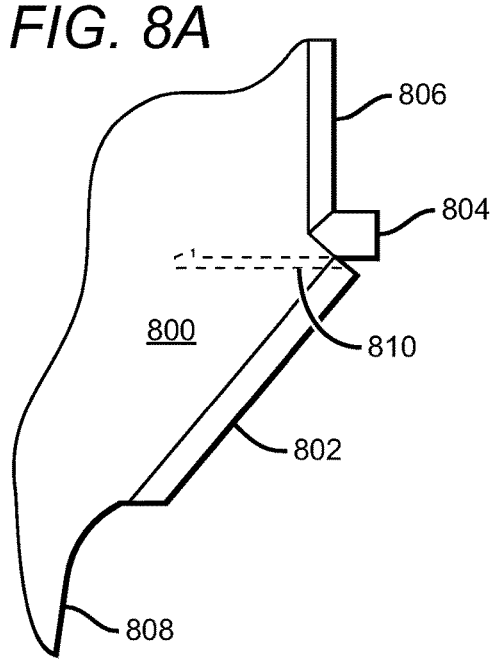
FIGS. 8A through 8C illustrate an example swing-up, extendable tray table.
Figure 8B:
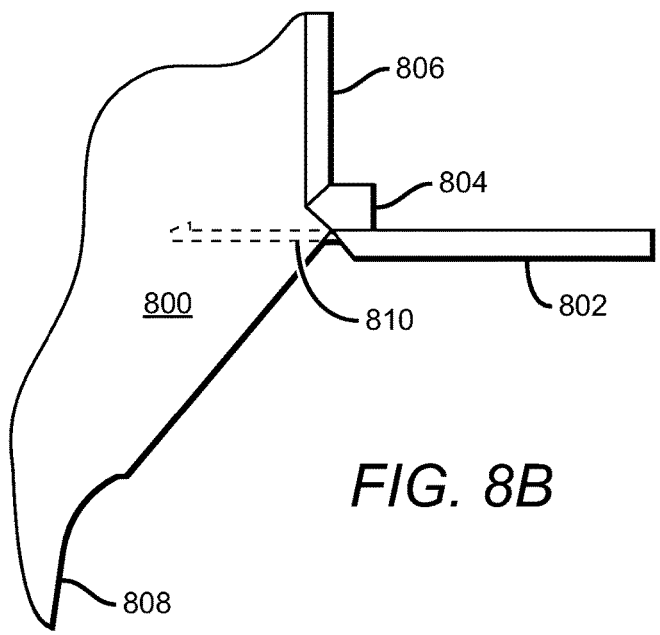
Figure 8C:
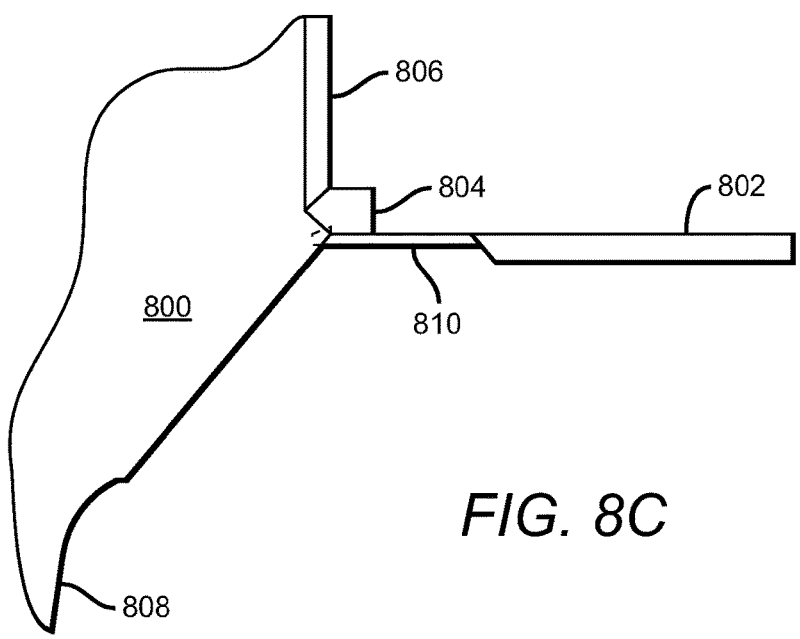

Turning to FIGS. 8A through 8C, in some embodiments, a pivoting, extendable tray table 802 is mounted to a monument partition 800 in front of a passenger seat above a foot well 808 and beneath a ledge 802 and a monitor 806. Similar to the embodiment of FIGS. 7A through 7C, because the tray table 802 does not foldably stow against the monument partition 800, the foot well 808 may be shorter than the foot well of FIGS. 1A through 1C. Although illustrated as being mounted at an angle, in other implementations, the tray table 802 may be mounted against a substantially vertical monument partition 800.

As illustrated in FIG. 8A, in a stowed position, the tray table 802 is releasably attached to the monument partition 800. For example, one or more complementary latching mechanisms may be mounted on the tray table 802 and the monument partition 800 for releasably securing the tray table 802 in the stowed position. For example, a thumb latch such as the thumb latch commonly found on seatback mounted tray tables may be mounted along an edge of the tray table 802 above the foot well 808.

Turning to FIG. 8B, in a first operative position, the tray table 802 swings upward from the stowed position and locks into a horizontal position beneath the ledge 804. In this manner, for example, the ledge 804 and monitor 806 may be mounted lower against the monument partition 800 than in the monument partition 100 of FIGS. 1A through 1C while providing a same mounting position for the tray table 102 in the second operative position as with the tray table 802 in the first operative position. The tray table 802, in the second operative position, may lock into position, for example, using a cam mechanism. In the second operative position, a portion of the tray table 802 is mounted beneath the ledge 804.

Turning to FIG. 8C, in some implementations, a linear extension mechanism 810, similar to the linear extension mechanism 112 described in relation to FIG. 1C, allows the tray table 802 to extend laterally toward a passenger seated in a passenger seat into a second operative position. In the second operative position, for example, the passenger may use the tray table 802 for work or as an eating surface. The second operative position may be similar in position to the third operative position of the tray table 102, described in relation to FIG. 1C.

Figure 9A:
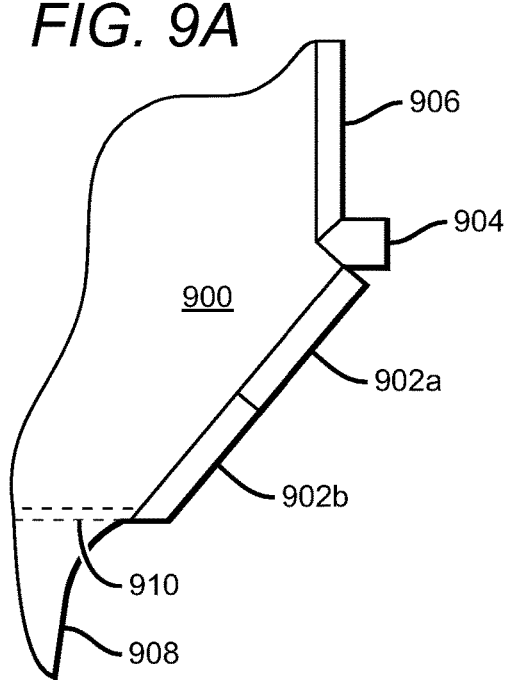
FIGS. 9A through 9D illustrate an example extendable, folding tray table according to another embodiment.
Figure 9B:
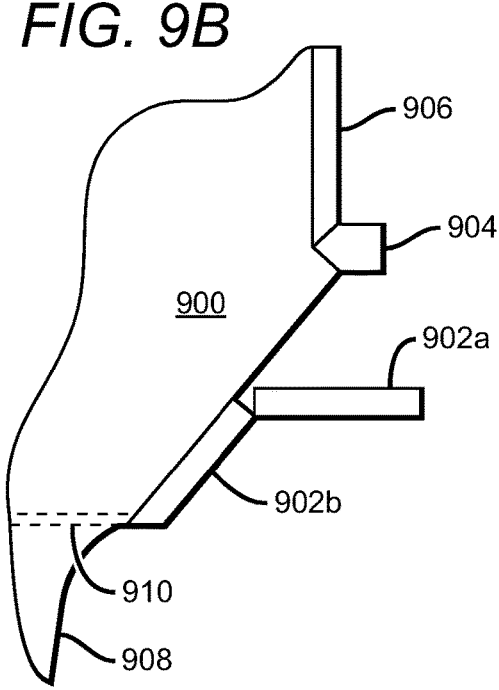
Figure 9C:
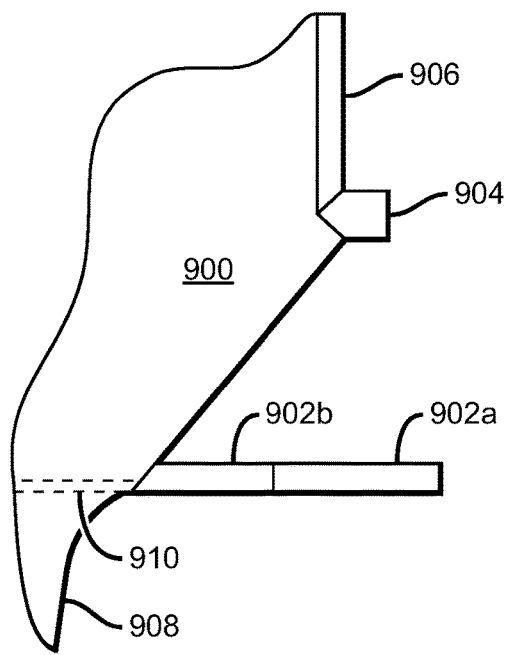
Figure 9D:
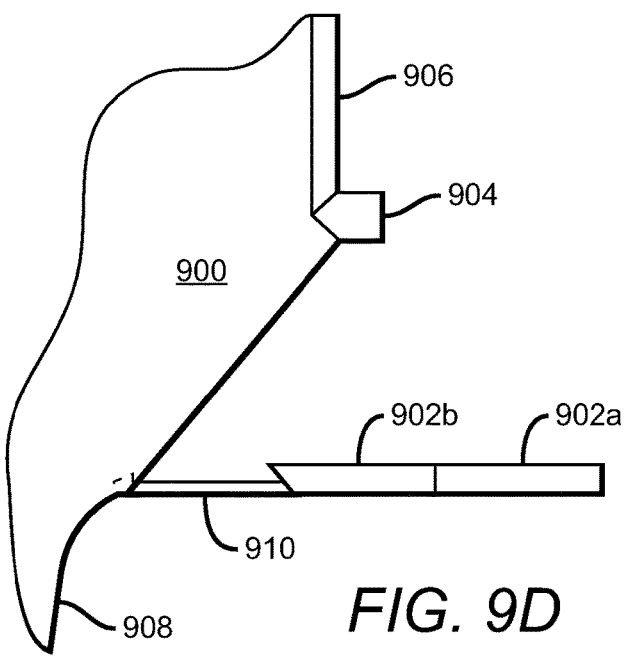

In some embodiments, as illustrated in FIGS. 9A through 9D, a folding, extendable tray table 902 is mounted to a monument partition 900 in front of a passenger seat above a foot well 908 and beneath a ledge 902 and a monitor 906. Similar to the embodiment of FIGS. 7A through 7C, the tray table sections 902a, 902b do not foldably stow against the monument partition 900. Unlike the embodiment of FIGS. 7A through 7C, because the tray table sections 902a, 902b each stow above a height of a fully deployed position, as illustrated in FIGS. 9C and 9D, the foot well 908 may have a similar size as the foot well 104 of FIGS. 1A through 1C. However, due to the mounting height of the tray table sections 902a, 902b in the stowed position of FIG. 9A, the monitor 906 may be mounted at a much higher position than the monitor 106 of FIGS. 1A through 1C. For this reason, the embodiment of FIGS. 9A through 9D may be better suited to configurations lacking well mounted monitors, for example configurations where tablet devices are used for personal video viewing.

Turning to FIG. 9A, in a stowed position, each of the first table section 902a and the second table section 902b mounts against the monument partition 900. Although illustrated in an angled mounting position, in other implementations, the first table section 902a and the second table section 902b may mount against a substantially vertical surface of a monument partition. Each of the first table section 902a and the second table section 902b is individually releasably secured to the monument partition 900, for example using complementary latching mechanisms in the first table section 902a and the second table section 902b and the monument partition 900. Conversely, in some implementations, the first table section 902a may be maintained in stowed position using a retractable ledge or lip extending from the ledge 904. Additionally, in some implementations, a partition mount apparatus housing extension member(s) 910 may be used for complementary latching or locking of the second table section 902b. The partition mount apparatus, for example, may be similar to the partition mount apparatus 304 described in relation to FIGS. 3A through 3D.

In some implementations, as illustrated in FIG. 9B, in a first operative position the first table section 902a is deployed horizontally from the monument partition 900 while the second table section 902b remains mounted against the monument partition 900. In the first operative position of FIG. 9B, the passenger may set a beverage or other small personal items upon the first table section 902a while maintaining clearance to exit the passenger seat and enter an aisle region. Further, the passenger may comfortably use the foot well region 908 while sitting in the passenger seat in a reclined or lounge position.

Turning to FIG. 9C, in some embodiments, the second table section 902b may be moved downwards into a horizontal position, along with a downward and outward movement of the first table section 902a, creating a substantially horizontal and contiguous table surface proximate the monument partition 900 and extending toward the seated passenger. At least a portion of the second table section 902b remains beneath the ledge 904, however, due to the distance between the ledge 904 and the second table section 902b a full sized water bottle or open laptop computer, for example, may be positioned against or in close proximity with the edge of the second table section 902b abutting the monument partition 900. In the second operative position, the passenger may retain personal space above his or her lap, allowing the passenger to hold a child or rest a keyboard upon his or her lap while using the tray table 902.

In a third operative position illustrated in FIG. 9D, in some implementations, the tray table 902 extends horizontally toward the user via linear extension member(s) 910.

The linear extension member(s) 910, for example, may be similar in configurations to embodiments described in relation to linear extension members 112 of FIG. 1C. While in the third operative position, the passenger may use the tray table 902 as an eating surface or a work area.

Turning to FIGS. 10A through 10D, a folding, extendable tray table 1002 is mounted to a monument partition 1000 in front of a passenger seat above a foot well 1008 and beneath a ledge 1002 and a monitor 1006. Similar to the embodiment of FIGS. 1A through 1C, the tray table sections 1002a, 1002b foldably stow against the monument partition 1000. Unlike the embodiment of FIGS. 1A through 1C, the first operative position, illustrated in FIG. 10B, involves swinging the first table section 1002 upward such that it deploys inline with the ledge 1002. The embodiment of FIGS. 10A through 10, thus, may be beneficial in circumstances where there is no monitor 1006, and a tablet computer or other display device may be positioned upon the first table section 1002a in the first operative position, for example leaning against the ledge 1004 or otherwise secured in a vertical position (e.g., in circumstances where there is also no ledge 1004). Although illustrated as being mounted in an angled position, in other implementations, the table sections 1002a, 1002b may foldably stow against a substantially vertical portion of the monument partition 1000.

Figure 10A:
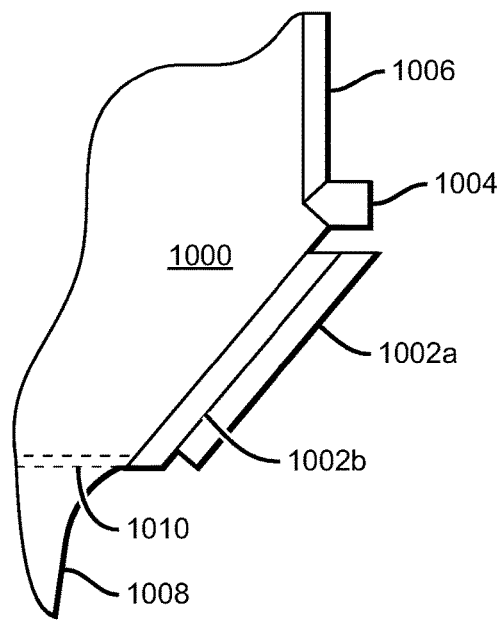
FIGS. 10A through 10D illustrate an example extendable, folding tray table according to a further embodiment

Turning to FIG. 10A, in the stowed position, the table sections 1002a, 10002b may be individual retained in position such that, in the first operative position of FIG. 1B, the second table section 1002b remains stowed against the monument partition 1000 while the first table section 1002a is deployed in a substantially horizontal position. In some examples, the second table section 1002b may be retained using complementary latching mechanisms between the second table section 1002b and at least one of the monument partition 1000 and the ledge 1004, while the first table section 1002a is releasably connected to one of the second table section 1002b and a latching mechanism deployed from one of the ledge 1004 and the foot well 1008. Additionally, in some implementations, a partition mount apparatus housing extension member(s) 1010 may be used for complementary latching or locking of at least one of the first table section 1002a and the second table section 902b. The partition mount apparatus, for example, may be similar to the partition mount apparatus 304 described in relation to FIGS. 3A through 3D.

Figure 10B:
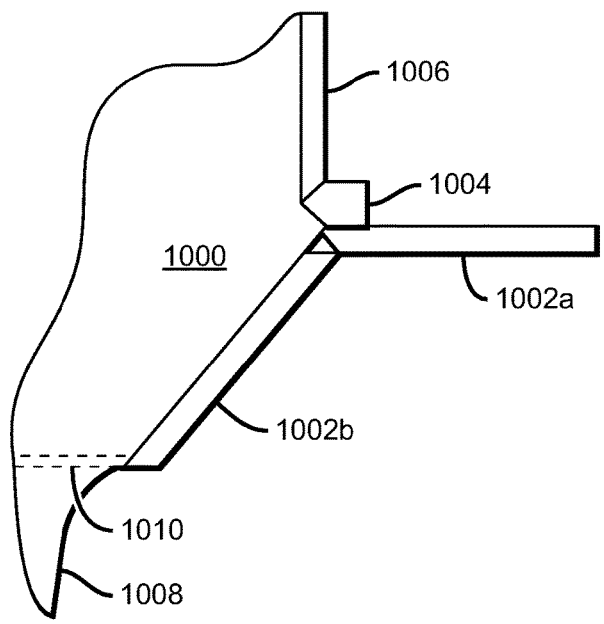

As illustrated in FIG. 10B, in some implementations, the first table section 1002a rotates up to mount in a first operative position horizontally beneath the ledge 1004. In the first operative position, for example, the passenger may prop a personal electronic device such as a table computer for viewing, or set a beverage or small personal item upon the surface of the first table section 1002a. The first table section 1002a may maintain its position, for example, through a locking cam or by locking to an underside of the ledge 1004. While in the first operative position, a passenger may exit the passenger seat while maintaining a beverage or personal items on the first table section 1002a due to clearance afforded.

Figure 10C:
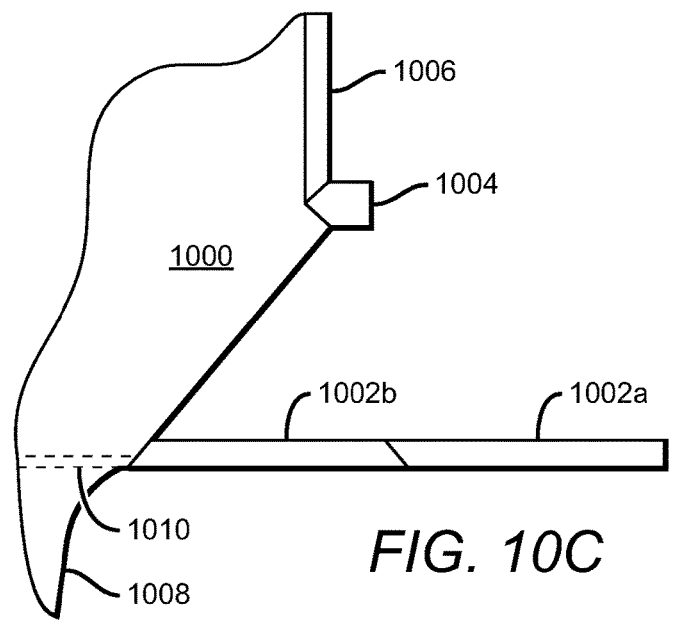

In some implementations, the first table section 1002a may be moved lower and outwards to a second operative position of FIG. 10C, while the second table section 1002b lowers from its stowed position to a horizontal position. In the second operative position, the first table section 1002a and the second table section 1002b provide a contiguous, horizontal table surface. A portion of the second table section 1002b may be disposed vertically beneath the ledge 1004 while a rear edge of the second table section 1002b is positioned proximate or abutting the monument partition 1000. While in the second operative position, the passenger may retain a meal tray or laptop computer on the tray table surface while maintaining personal space above the lap for holding a child or resting a keyboard for interfacing with the laptop computer.

Figure 10D:
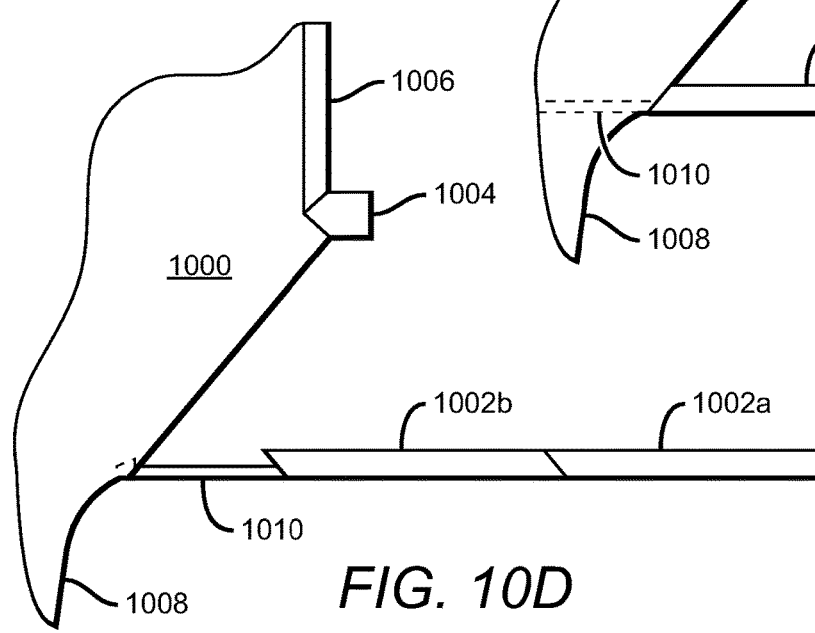

In some implementations, the tray table 1002 is configured for lateral movement into a third operative position, as illustrated in FIG. 10D. In the third operative position, at least one linear extension member 1010, such as the linear extension members 112 described in relation to FIG. 1C, allow extension of the tray table 1002 toward the passenger. For example, the passenger may pull on an edge of the first table section 1002a to draw the tray table 1002 over the passenger's lap. In the third operative position, the passenger may use the tray table as a work surface or a meal table.

The tray table apparatus described in the implementations above provides multiple position options for using a tray table surface while maintaining access to a foot well portion of a monument partition. The position options, for example, may include a half-deployed position in which the passenger can retain a beverage or other small personal items upon the tray table while maintaining clearance for exiting the passenger seat into the aisle area. Further, the tray table apparatus described above may provide the benefit of using a full size or nearly full size tray table, for example to hold a meal tray or laptop computer, while maintaining personal space in the lap area for holding a child or resting a separate keyboard device for interacting with the laptop. In various embodiments, movement of the tray table between the stowed position and each operative position may be simple and require little force from the passenger.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft tray table apparatus, the tray table apparatus comprising:
   a tray table comprising a first table section, and a second table section, wherein a front edge of the second table section is hingedly connected to a rear edge of the first table section; and
   a partition mount for releasably receiving the first table section and the second table section, the partition mount including
      a rigid top member connecting a first vertical side wall and a second vertical side wall,
      a first guide member arranged on an inner surface of the first vertical side wall, and
      a second guide member arranged on an inner surface of the second vertical side wall;
   wherein, in a stowed position, a rear edge of the second table section is positioned at the top of the first guide member and the second guide member, and a front edge of the first table section is releasably received by a locking mechanism;
   wherein, in a first operative position, the front edge of the first table section extends horizontally from the partition mount, and the rear edge of the second table section remains positioned at the top of the first guide member and the second guide member; and wherein, in a second operative position, the rear edge of the second table section is at a bottom of the first guide member and the second guide member, and the second table section is horizontal and in line with the first table section.

2. The aircraft tray table apparatus of claim 1, wherein, in the stowed position, the first table section is mounted at an angle to a partition to which the partition mount is mounted.

3. The aircraft tray table apparatus of claim 2, wherein the partition is a passenger suite partition.

4. The aircraft tray table apparatus of claim 1, wherein each of the first vertical side wall and the second vertical side wall has a substantially triangular shape, wherein, in the stowed position, the first table section is aligned with a first edge of each of the first and second side walls and the second table section is aligned with a second edge of each of the first and second side walls.

5. The aircraft tray table apparatus of claim 1, wherein, to move the tray table apparatus to the first operative position, a passenger manually releases the locking mechanism.

6. The aircraft tray table apparatus of claim 5, wherein the locking mechanism includes one or more clips, wherein, in the stowed position, the one or more cups are configured to mate with one or more respective apertures disposed on the front edge of the first table section.

7. The aircraft tray table apparatus of claim 6, wherein the locking mechanism includes a release button coupled to the one or more clips, wherein actuation of the release button causes release of the one or more clips from the one or more respective apertures such that gravity causes the first table section to hingedly rotate to the first operative position.

8. The aircraft tray table apparatus of claim 1, further comprising a stabilizing member hingedly coupled between the rear edge of the first table section and the front edge of the second table section, wherein, in the first and second operative positions, the stabilizing member is configured to extend in a substantially vertical direction beneath the first and second table sections, and the stabilizing member is configured to provide a greater load capacity to the first and second table sections.

9. The aircraft tray table apparatus of claim 8, wherein, upon impact by an object, the stabilizing member is configured to hinge upward and backward against a bottom surface of the second table section.

10. The aircraft tray table apparatus of claim 1, wherein the tray table apparatus is configured for positioning in a third operative position, wherein, in the third operative position, the first guide member and the second guide member are extended, deploying the tray table toward a seated passenger.

11. The aircraft tray table apparatus of claim 10, further comprising a first extension member and a second extension member affixed to each side of the tray table, wherein each of the first and second extension members includes a plurality of slideably coupled extension rails configured to slideably extend the tray table toward the third operative position and to retract the tray table toward the second operative position.

12. The aircraft tray table apparatus of claim 1, wherein at least one of the first guide member and the second guide member is laterally offset from a longitudinal axis of the partition mount such that the first guide member and second guide member are positioned at opposite ends of a foot well region of a passenger suite.

13. The aircraft tray table apparatus of claim 1, wherein, in the second operative position, at least a portion of the second table section is positioned beneath the partition mount, and the first table section extends beyond a front edge of the partition mount.

14. The aircraft tray table apparatus of claim 1, wherein the first table section is rotatably connected to the second table section by at least one viscous rotary dampener to provide for controlled articulation of the first table section from the stowed position to the first operative position.

15. The aircraft tray table apparatus of claim 1, wherein at least one of the first guide member and the second guide member comprises a guide rail configured to provide a sliding surface for a side edge of the second table section moving between the first operative position and the second operative position.

16. An aircraft passenger suite, comprising:
a partition disposed forward of a passenger seat; and
a tray table apparatus mounted to the partition, the tray table apparatus comprising
a tray table comprising a first table section, and a second table section, wherein a front edge of the second table section is hingedly connected to a rear edge of the first table section;
a partition mount for releasably receiving the first table section and the second table section, the partition mount including
a first side wall, a second side wall, and a rigid top member connecting the first side wall and the second side wall, and
a locking mechanism proximate the rigid top member for releasably receiving a front edge of the first table section; and
a translation assembly configured to vertically translate the tray table away from the partition;
wherein, in a stowed position,
the first table section and the second table section are substantially enclosed within the partition mount, and
each of the first table section and the second table section are stowed at an angle to horizontal;
wherein, in a first operative position, the front edge of the first table section extends horizontally from the partition, and the second table section remains in a same position as in the stowed position, wherein the locking mechanism prevents movement of the first table section to the first operative position from the stowed position;
wherein, in a second operative position, the second table section is horizontal and in line with the first table section; and
wherein, in a third operative position, the second table section and the first table section are extended away from the partition along the translation assembly.

17. The aircraft passenger suite of claim 16, wherein, in the first operative position, an amount of extension of the first table section of the tray table apparatus from the partition toward the passenger seat allows for unobstructed access to a foot well region of the passenger suite such that the seat is configured to be articulated between an upright position and a lie flat position.

18. The aircraft passenger suite of claim 16, wherein, in the stowed position, the first table section is stowed in a first angular position to horizontal, and the second table section is stowed at a second angular position to horizontal different than the first angular position.

19. The aircraft passenger suite of claim 16, wherein, the partition mount comprises:
   a first guide member arranged on an inner surface of the first side wall; and
   a second guide member arranged on an inner surface of the second side wall;
   wherein, when moving from the second operative position to the first operative position,
      the rear edge of the second table section engages with the first guide member and the second guide member, and
      the rear edge of the second table section is guided by the first guide member and the second guide member upward along the inner surfaces of the first and second side walls.

20. The aircraft passenger suite of claim 16, wherein the translation assembly comprises at least one extension member including a plurality of slideably coupled extension rails configured to slideably extend the tray table toward the third operative position and to retract the tray table toward the second operative position.

* * * * *